(12) United States Patent
Gough et al.

(10) Patent No.: US 7,840,956 B2
(45) Date of Patent: Nov. 23, 2010

(54) EDITOR FOR PROGRAM FILES

(75) Inventors: Michael Lane Gough, Ben Lomond, CA (US); Stephanie Eva Koester, San Francisco, CA (US); Brian Burnell McGhie, Santa Clara, CA (US); James Ieyasu Miyake, San Jose, CA (US); Richard Victor Nygord, San Jose, CA (US); Samir Ranjan Tiongson Saxena, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1292 days.

(21) Appl. No.: 11/134,373

(22) Filed: May 23, 2005

(65) Prior Publication Data

US 2005/0210445 A1  Sep. 22, 2005

Related U.S. Application Data

(60) Division of application No. 10/260,036, filed on Oct. 4, 1999, which is a continuation of application No. 08/644,413, filed on May 10, 1996, now abandoned.

(51) Int. Cl.
*G06F 9/44* (2006.01)

(52) U.S. Cl. ..................... 717/170; 717/169

(58) Field of Classification Search .......... 717/168–170
See application file for complete search history.

(56) References Cited

U.S. PATENT DOCUMENTS

| 4,827,404 A | 5/1989 | Barstow et al. |
|---|---|---|
| 4,974,160 A | 11/1990 | Bone et al. |
| 5,159,687 A | 10/1992 | Richburg |
| 5,163,130 A | 11/1992 | Hullot |
| 5,168,441 A | 12/1992 | Onarheim et al. |
| 5,187,788 A | 2/1993 | Marmelstein |
| 5,247,693 A | 9/1993 | Bristol |
| 5,257,377 A * | 10/1993 | Sathi et al. ............. 717/170 |
| 5,287,448 A | 2/1994 | Nicol et al. |
| 5,301,301 A | 4/1994 | Kodosky et al. |
| 5,325,531 A | 6/1994 | McKeeman et al. |
| 5,450,545 A * | 9/1995 | Martin et al. ............. 717/109 |
| 5,475,851 A | 12/1995 | Kodosky et al. |
| 5,488,569 A | 1/1996 | Kaplan et al. |
| 5,513,309 A | 4/1996 | Meier et al. |
| 5,517,663 A | 5/1996 | Kahn |
| 5,519,866 A | 5/1996 | Lawrence et al. |
| 5,528,490 A * | 6/1996 | Hill ............. 717/168 |
| 5,537,630 A | 7/1996 | Berry et al. |
| 5,579,223 A | 11/1996 | Raman |
| 5,600,834 A * | 2/1997 | Howard ............. 707/201 |
| 5,619,700 A * | 4/1997 | Abe ............. 717/122 |

(Continued)

*Primary Examiner*—Anna Deng
(74) *Attorney, Agent, or Firm*—Buchanan Ingersoll & Rooney PC

(57) ABSTRACT

Methods and systems are disclosed for updating a candidate computer program file. An exemplary method includes loading a first and second revisions of a first computer program file, loading a first revision of a second computer program file, and generating a candidate computer program file. References are made to the first and second revisions of the first computer program file and the first revision of the second computer program file in generating the candidate computer program file.

9 Claims, 25 Drawing Sheets

U.S. PATENT DOCUMENTS

| | | | |
|---|---|---|---|
| 5,642,511 A | 6/1997 | Chow et al. | |
| 5,652,884 A | 7/1997 | Palevich | |
| 5,675,802 A | 10/1997 | Allen et al. | |
| 5,680,613 A * | 10/1997 | Atsumi | 707/103 R |
| 5,680,621 A * | 10/1997 | Korenshtein | 717/168 |
| 5,717,887 A * | 2/1998 | Leslie | 717/173 |
| 5,802,549 A * | 9/1998 | Goyal et al. | 711/102 |
| 5,854,932 A * | 12/1998 | Mariani et al. | 717/116 |
| 5,857,107 A * | 1/1999 | Tsuchida | 717/170 |
| 5,881,151 A * | 3/1999 | Yamamoto | 726/24 |
| 6,131,088 A * | 10/2000 | Hill | 705/27 |
| 6,269,475 B1 | 7/2001 | Farrell et al. | |
| 6,732,358 B1 * | 5/2004 | Siefert | 717/173 |
| 2004/0102960 A1 * | 5/2004 | Shimomura et al. | 704/9 |

* cited by examiner

| Index Objects | |
|---|---|
| Index Term | Hidden Name |
| ▷ 32-Bit addressing | none —308 |
| ▷ accent marks | none |
| ▷ access  /304 | none |
| ▷ access privileges | Clark Kent |
| ▷ activating | none |
| ▽ active window | none |
|     front window | |
| 300—     target window | |
| ▷ adjusting | none |
| ▷ alias | none |
| ▷ aligning icons | none |

| Related Sequences | |
|---|---|
| I | adjusting | adjust the disk cache?
adjust the mouse or trackball?
adjust the sensitivity to sound?
adjust window shrinking?

EDITOR FOR PROGRAM FILES

This disclosure is a divisional of application Ser. No. 10/260,036, filed on Oct. 4, 1999, which is a continuation of application Ser. No. 08/644,413, filed on May 10, 1996 (now abandoned).

BACKGROUND OF THE DISCLOSURE

The present invention relates generally to graphical user interfaces for computer systems. More particularly, the present invention relates to methods and systems for creating and editing program code which governs the presentation of user guidance information.

The rapid advance of computer technology has enabled programmers to greatly enhance the sophistication of their software programs. Yet an increase in sophistication often brings an increase in application complexity. Such complexity often serves to confuse and frustrate computer users as they attempt to learn a new computer application, especially when the software manuals are large and burdensome to use.

The computer industry has attempted to address the above drawback by designing application programs with user-friendly display interfaces. Generally, the user-friendly paradigm aims to present information in the simplest and most intuitive fashion possible. This may be achieved by organizing information using a series of hierarchical menus or windows. Also, user-friendliness is promoted by including graphical metaphors in the display interface instead of non-descriptive command-line prompts. For example, object-oriented display systems frequently employ images of file folders for storage of information, and graphical depictions of trash containers for disposal (e.g. deletion) of information.

Another way of assisting an unfamiliar operator in using a computer application has been through user guidance interfaces (e.g. "help" interfaces). Such interfaces allow a user to quickly obtain help when unsure how to proceed at a particular juncture in the execution of a program. For example, a user can activate a help icon or menu entry when confused. The system may surmise the user's problem depending on the particular point in the program at which the user has activated the help function. Alternatively, the user may focus his inquiry by placing a cursor over an icon, menu, file folder or display object, whereupon the system responds by displaying an explanation of the selected display object. Still more focused guidance can be obtained by tailoring different help messages to different users. For instance, an expert at a particular application might prefer not to be bothered with a lengthy user guidance message. As such, only a cursory explanation is provided to the expert user. In contrast, a novice user might require a relatively large amount of information to successfully navigate through the application program. Accordingly, the help message given to the novice user may be quite lengthy.

While the above user-interface techniques have greatly enhanced the enjoyment and ease of using complex application programs, developing intricate guidance files for each application has proven very time consuming and burdensome. For example, the guidance files for the Apple family of computers relies on the generation of script files. "Script" is textual high-level program code, usually developed using a word processor or special script editor. User guidance information is often highly repetitive; one program module may employ virtually the same messages as another program module. Hence, the program designer has been forced to tediously duplicate the same script for each separate module. Even when "cut" and "paste" editing commands are employed, the task of creating script is still burdensome.

Further, translating and compiling the word processor's script language takes a considerable amount of time. It is especially cumbersome to re-translate the entire source file every time a revision is made in the source program. This difficulty is compounded by the fact that the translators and compilers sometimes produce errors. According to known techniques, the occurrence of an error typically causes the user to recompile the entire source file.

Accordingly, it would be desirable to produce a graphical interface which is user-friendly to the program designer as well as the end user.

It is more particularly an exemplary object of the present invention to provide an editor of guidance information which relies less on the manual creation and translation of textual script.

SUMMARY

These and other exemplary advantageous features are achieved through a graphical editor for creating user guidance programs. The editor employs a database of user guidance program modules, each of which is associated with a component of a guidance display program. The editor allows the user to create and edit user guidance programs by selecting and aggregating different computer program modules. In this manner, the user is required to perform less editing on script text itself. In other words, the user can manipulate the program in units of program modules instead of individual lines of text script.

According to another exemplary aspect of the present invention, each user maintains a customized file of frequently used program modules. Each program module has a graphical icon associated therewith. The user creates a computer program sequence by selecting modules from a customized file and moving the modules to a sequence editor interface. At the sequence interface the user aggregates and arranges the modules to define the desired program function. The movement of modules from the customized file to the sequence editor may be via a "drag-and-drop" procedure.

According to another exemplary embodiment of the present invention, the sequence editor displays a program sequence by showing a graphical representation of the interconnected program modules. The user can edit individual program modules within the above described sequence of program modules by "clicking" on one of the program modules. This invokes a separate editor which displays the contents of the program module. The user can then edit the displayed program module using the separate editor interface. The separate editor may comprise a text editor for modifying the text of a program module, a panel or access editor for editing the graphical layout of panels used in the delivery of help information, and an index editor for editing words and phrases used to access guidance information relating to a particular topic.

The different editors allow the user to review a script program in a variety of different representations. If a user makes modifications to the script program in a particular representation, the system may automatically make corresponding changes in other representations. For example, if a user alters the script program using the graphical representation employed by the sequence editor, the system will make corresponding changes to the individual lines of script code, which may be reviewed using a text editor. In one embodiment, both graphical and textual representations may be presented simultaneously on the graphics display. This allows the user to review, in real-time, how changes made in the sequence editor affect the text of the script program.

When the user is finished editing the computer program, the user closes out the editor(s), whereupon the system compiles any portion of the computer program which was modified. According to another beneficial aspect of the present invention, any errors detected in the compiling operation are stored in association with a graphical icon. Clicking on this icon after the end of compilation provides a display of the erroneous text, whereupon the user may make corrections and recompile the corrected code.

The graphical editors of the present invention are designed to accept program code in parse tree code format, and to output information in the same parse tree format.

BRIEF DESCRIPTION OF THE DRAWINGS

The foregoing, and other, objects, features and advantages of the present invention will be more readily understood upon reading the following detailed description in conjunction with the drawings in which:

FIGS. 23-24 illustrate various aspects of the index editor according to exemplary characteristics of the present invention;

DETAILED DESCRIPTION

In the following description, for purposes of explanation and not limitation, specific details are set forth in order to provide a thorough understanding of the invention. However it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

Figure 1:
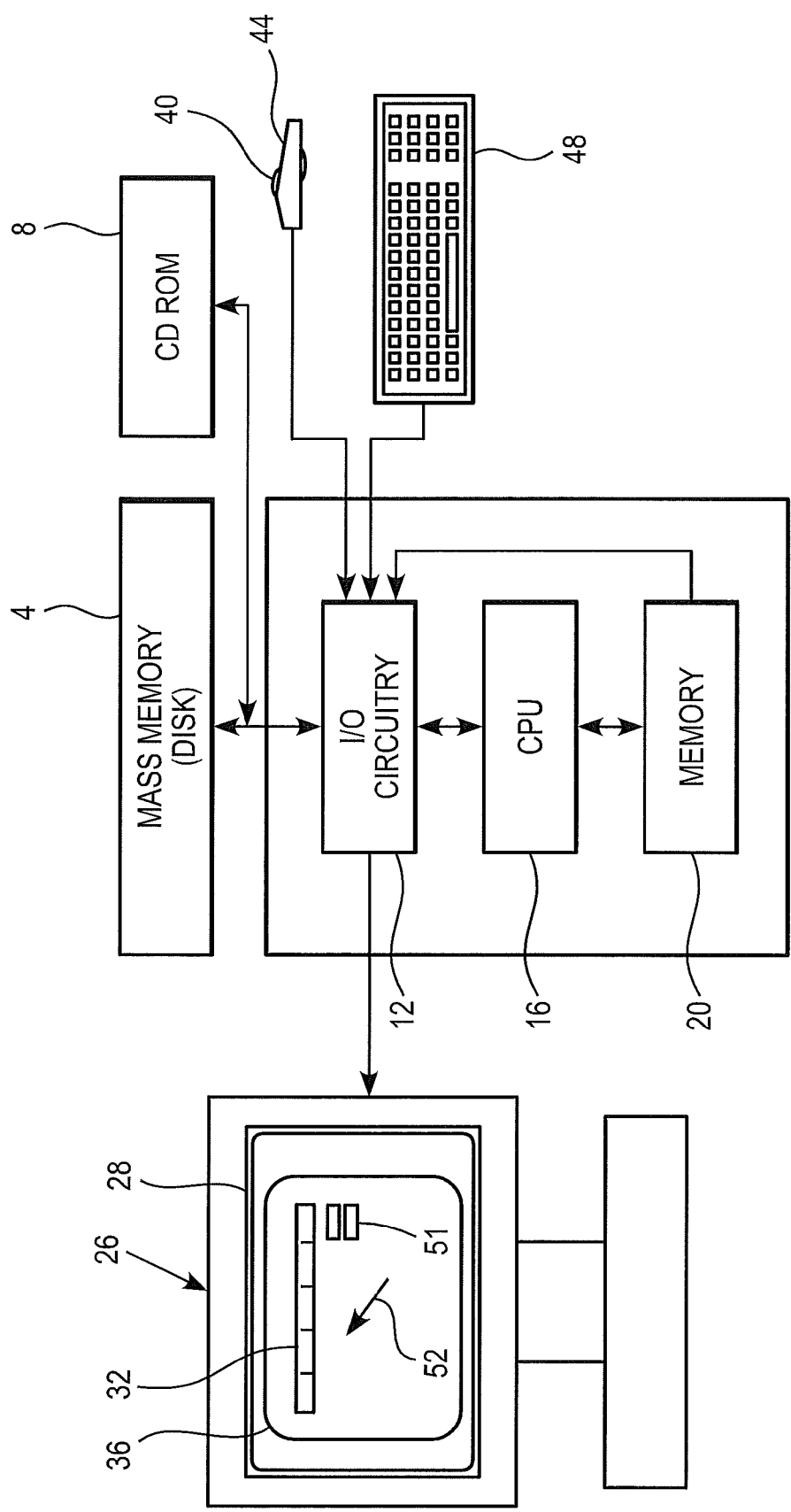
FIG. 1 illustrates an exemplary computer system for implementing the present invention.

The computer controlled editor of the present invention may be implemented by the exemplary computer system illustrated in FIG. 1. The computer controlled display system includes a central processing unit (16) interconnected with memory (20) and I/O circuitry (12). The I/O circuitry, in turn, communicates with display monitor (26), mass memory device (e.g. 4), CD ROM (8), keyboard (48) and mouse (44). The mouse (44) includes one or more input means (40), such as one or more "click buttons" for inputting information into the computer system. Alternatively, the computer system may employ other input means, such as a joystick, graphic tablet or track-ball type of input device, as will be apparent to one having ordinary skill in the art.

The CPU (16), in conjunction with program instructions received from memories (4), (8) and/or (20), presents information on the display (26) using the well known window-based display paradigm. FIG. 1 shows a typical display presentation (28) including a window (36). Window (36) in turn includes a menu bar (32) disposed horizontally across the length of the window. Window bar (32) may include one or more "pull-down menus" (51). Movement of the mouse (44) may be translated by the computer into movement of the cursor (52) on the display presentation (28).

The Macintosh® series of computers sold by Apple Computer, Inc. may be used to implement the above functions. However, it should be apparent that other commercially available computer systems may be used to carry out the present invention.

A. Guidance Interface

A.1 Overview

The advantageous features of the program editor of the present invention may be best appreciated by first discussing exemplary aspects of the guidance interface itself. One way of invoking the guidance interface of the present invention is through activation of an appropriate guidance related menu entry located in menu bar (32). For example, the menu bar (32) may include a pull down menu (51) including a menu entry entitled "help" associated with the guidance interface. "Clicking" on the "help" menu entry causes the generation of an access window (62) shown in FIG. 2, which may be viewed as a central "portal" for obtaining guidance information on various aspects of the computer system's operation. Among other features, the guidance information may identify how a particular program feature operates, or may provide a series of tutorials designed to coach the user how to use a program feature in step-by-step fashion.

The access window (62) allows the operator to retrieve information using three different techniques: topic search, index search and "look for" search, each of which will be discussed below.

A.2 Topic Search

The topic search is activated by the user placing the cursor (52) over the "topics" icon (64) and depressing the mouse button (40). The system responds by calling a series of topic titles from memory (4) or CD-ROM (8) and displaying them in the topic area (72). A user may select one of the titles within region (72) by scrolling a sliding bar (70) either up or down until he or she reaches a desired topic. In the specific embodiment of FIG. 2, the user has stopped at the title (70) reading "Files and disks". Depressing the mouse button (40) while positioned at this title causes CPU (16) to display a series of questions pertinent to "Files and Disks" at the right-hand column of the access window. The user may scroll through the right-hand list of questions via the right-hand scroll bar.

Figure 3:
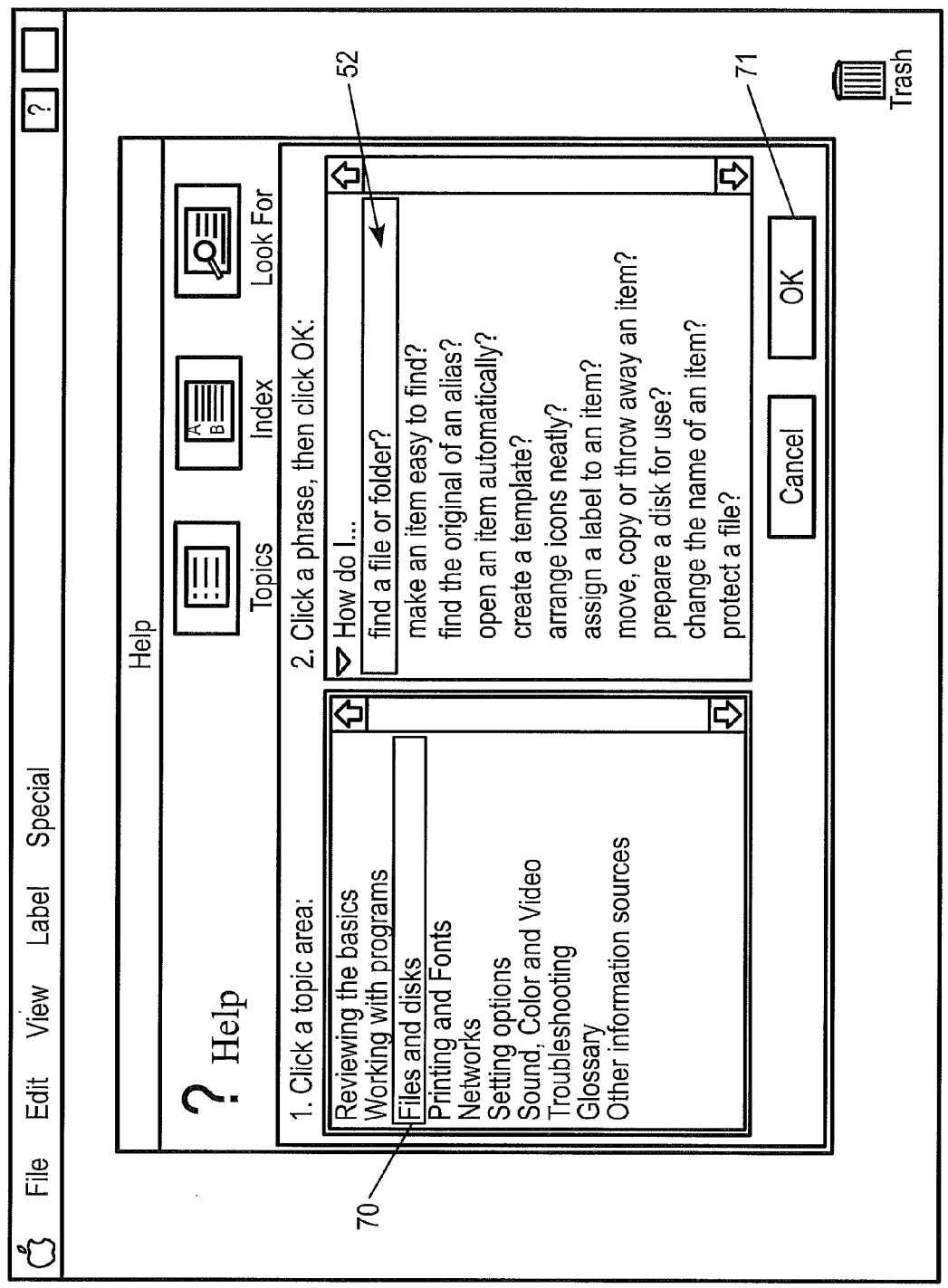
Figure 4:
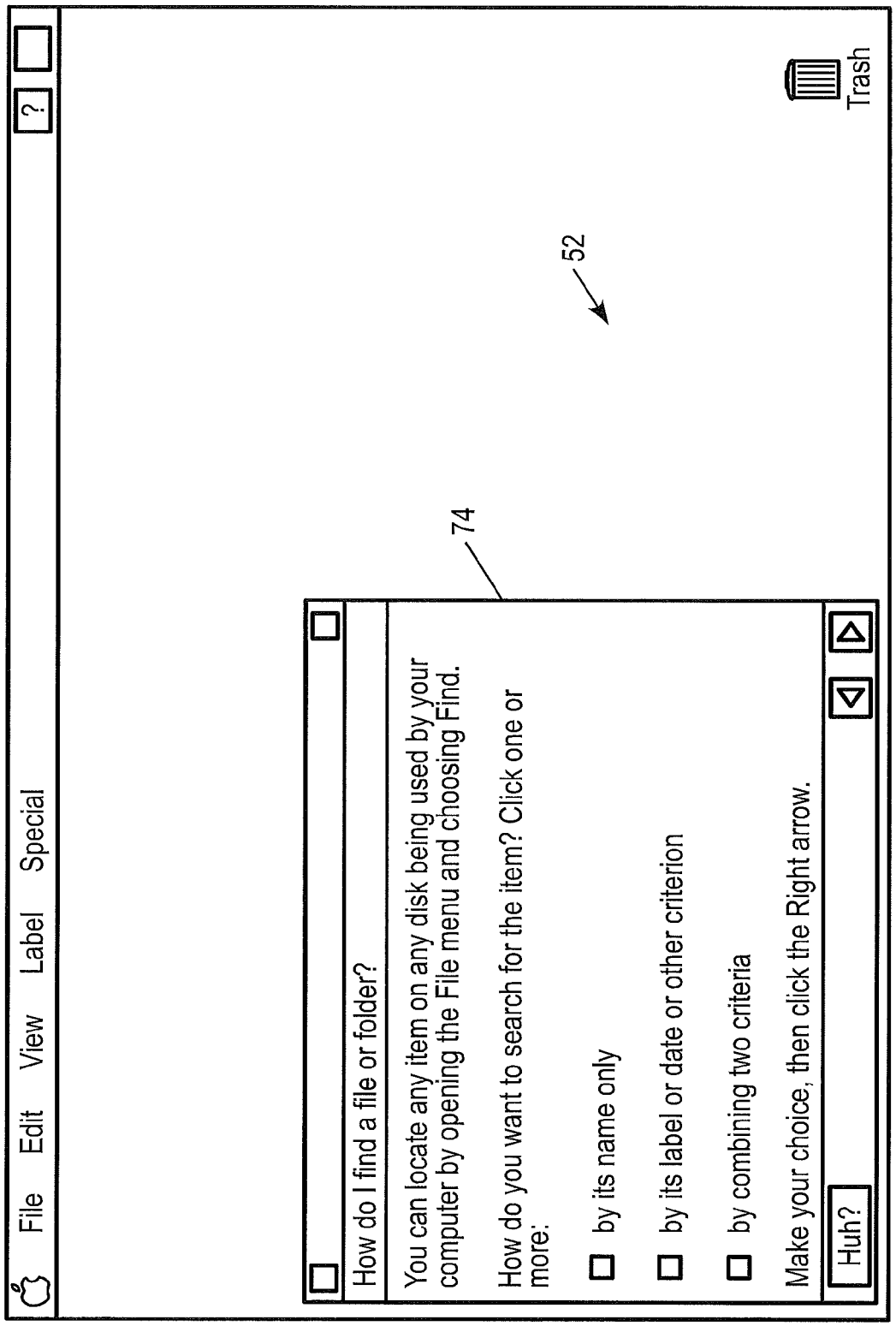

If the user finds an interrogatory which matches his own query, he places the cursor (52) over the relevant interrogatory, and presses mouse button (40). For instance, in FIG. 3, the user has selected the interrogatory "find a file or folder?". The user then finalizes the selection by clicking on the OK button (71) in the lower right-hand corner. This prompts the CPU (16) to display an information panel (74) relevant to the interrogatory, as illustrated in FIG. 4. As shown, the panel (74) effectively answers the user's query.

A.3 Index Search

Figure 5:
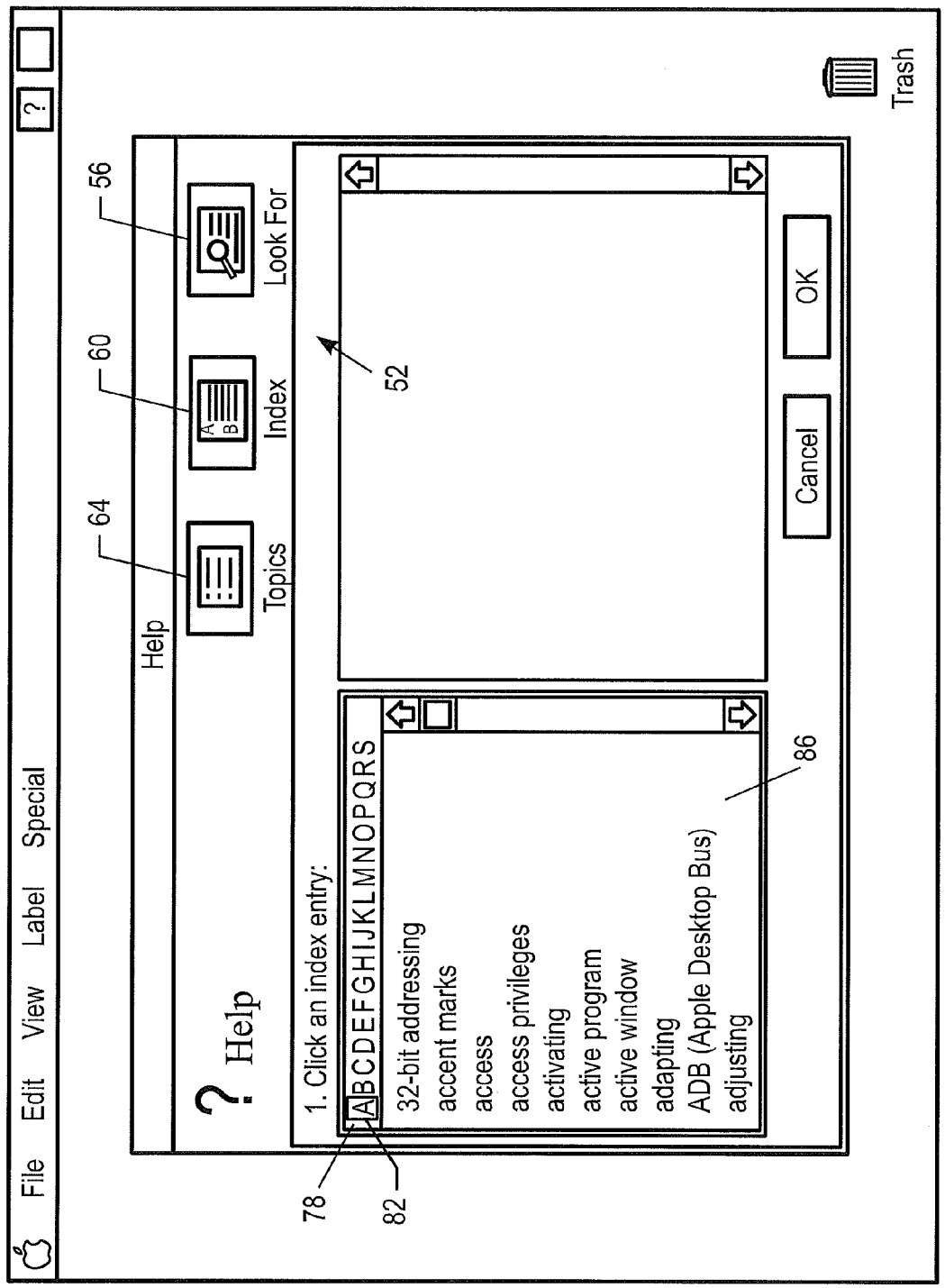
FIGS. 5-8 illustrate exemplary windows for accessing guidance information using an "index" search.
Figure 6:
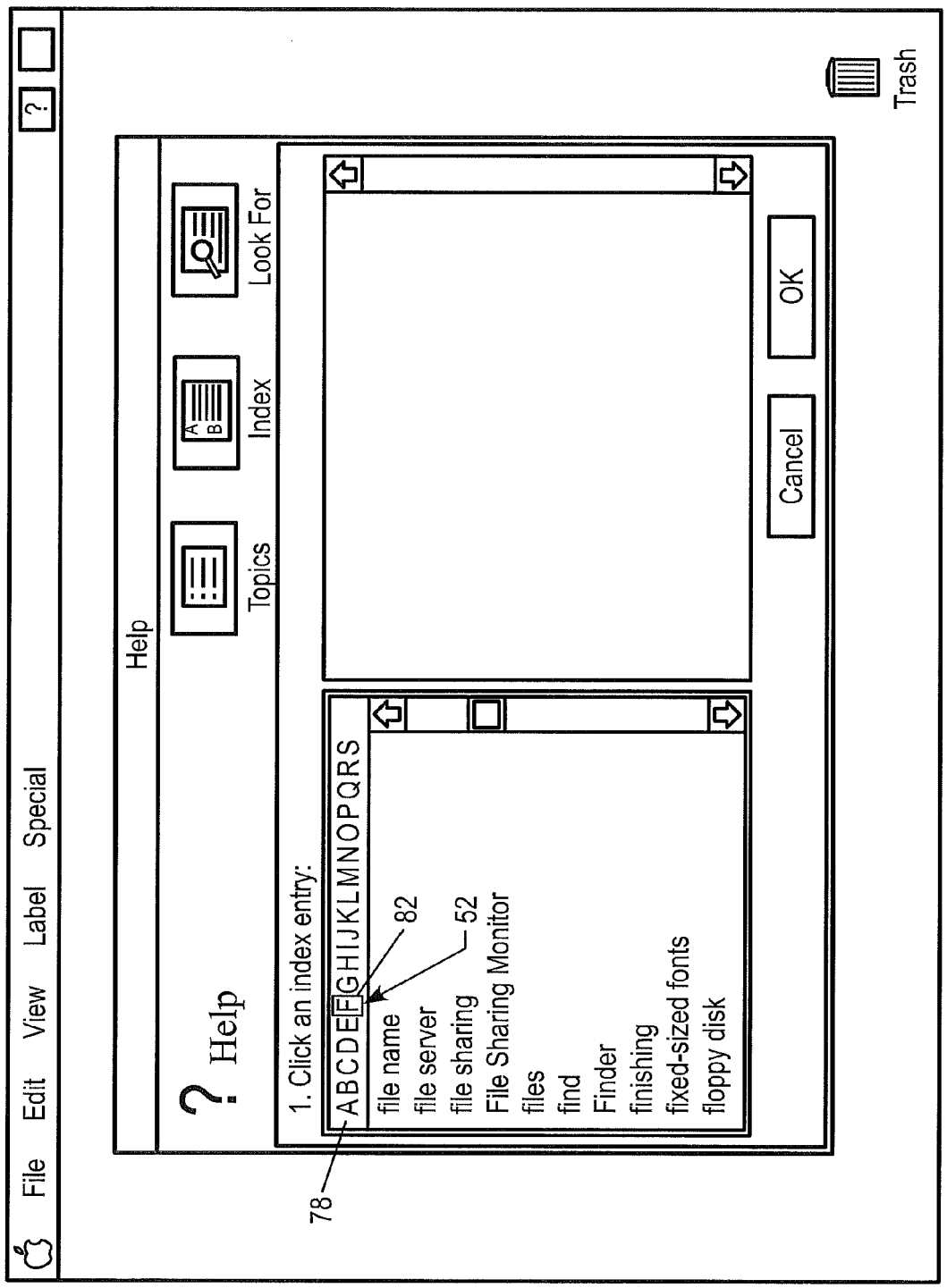
Figure 7:
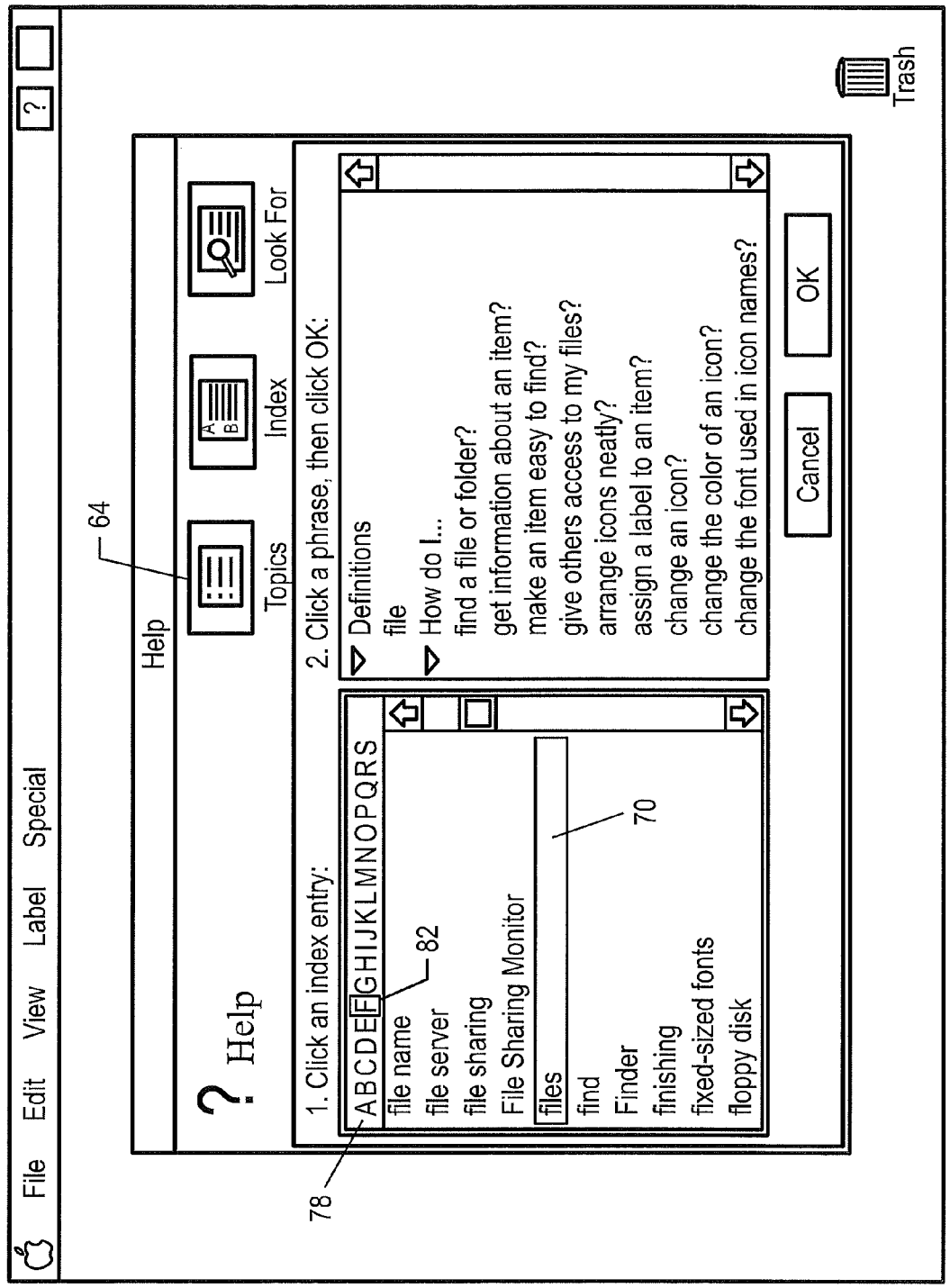
Figure 8:
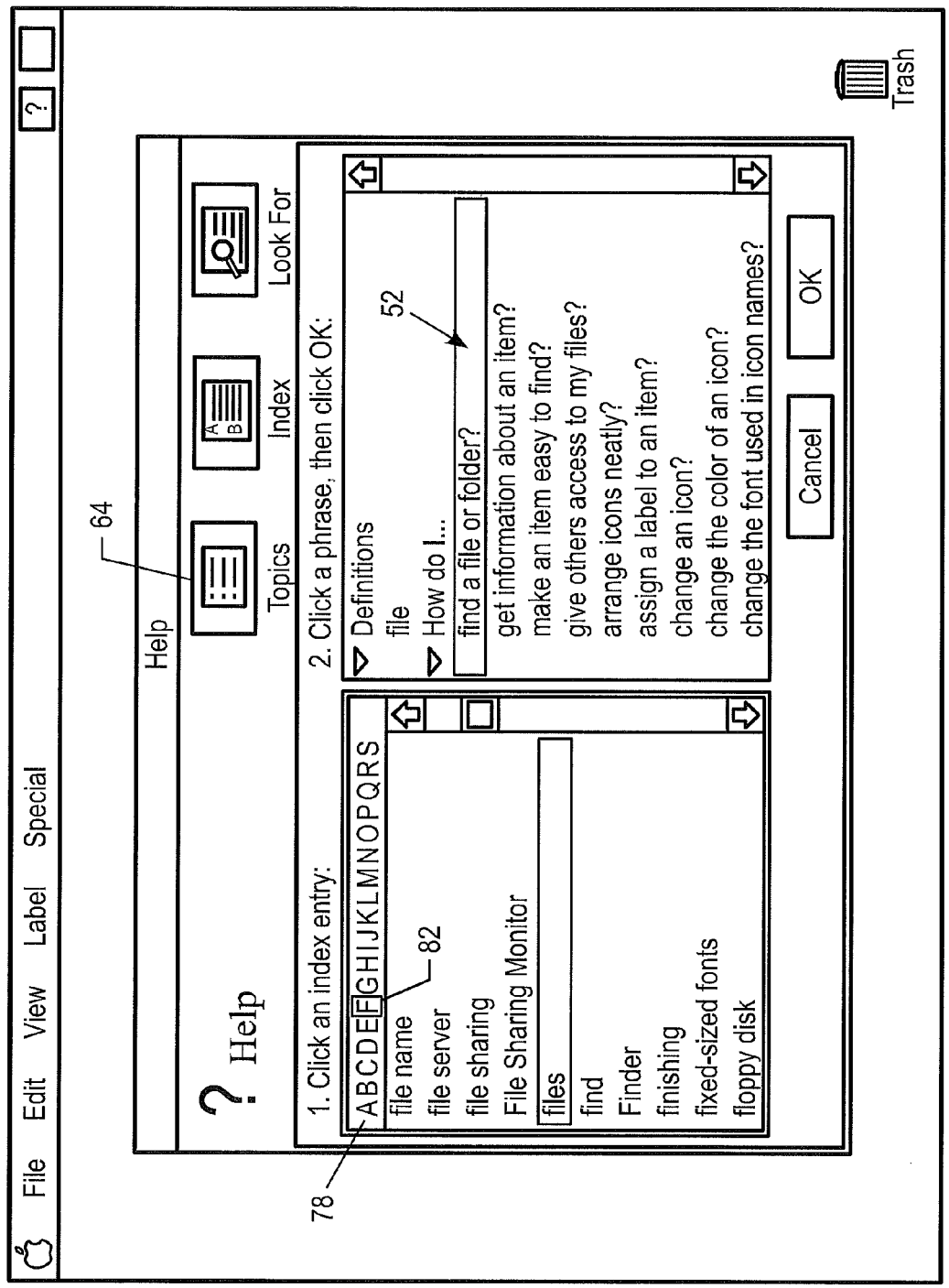

The same information can be obtained by initially pressing the "index" icon (60) illustrated in FIG. 5. This causes the CPU to generate an index screen (86) containing "index entries". The index screen is headed by a horizontal alpha scroll bar (78). In operation, the user places cursor (52) over a desired letter and momentarily clicks the button (40) of the mouse. For example, in FIG. 6 the user has selected the letter "F" by positioning the cursor over the letter "F" and clicking the mouse. Upon sensing the selection, the CPU (16) displays index entries beginning with the selected letter as illustrated in FIG. 6. Henceforth, the retrieval of additional information proceeds in the same manner discussed before with regard to the topic search. For instance, the user may scroll down through the list of index entries and select an appropriate topic. By clicking on the appropriate topic the CPU will generate a list of more refined questions (as illustrated in the right-hand column of FIG. 7). The user then selects an appropriate question within the right-hand column, as shown in FIG. 8. This will prompt the CPU (16) to generate the same information shown above in FIG. 4.

A.4 Look For Search

Figure 9:
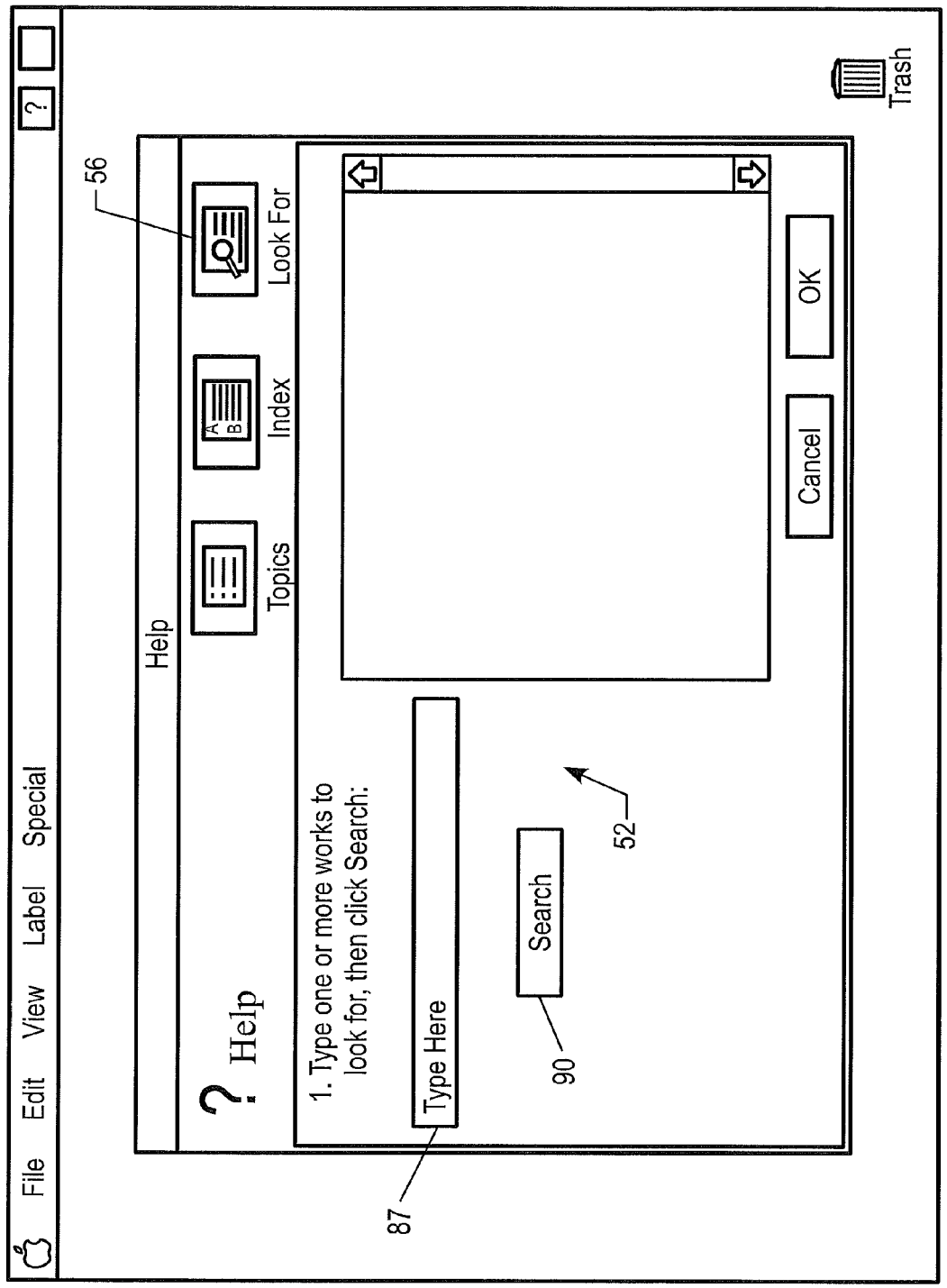
FIGS. 9-10 illustrate exemplary windows for accessing guidance information using a "look for" search.
Figure 10:
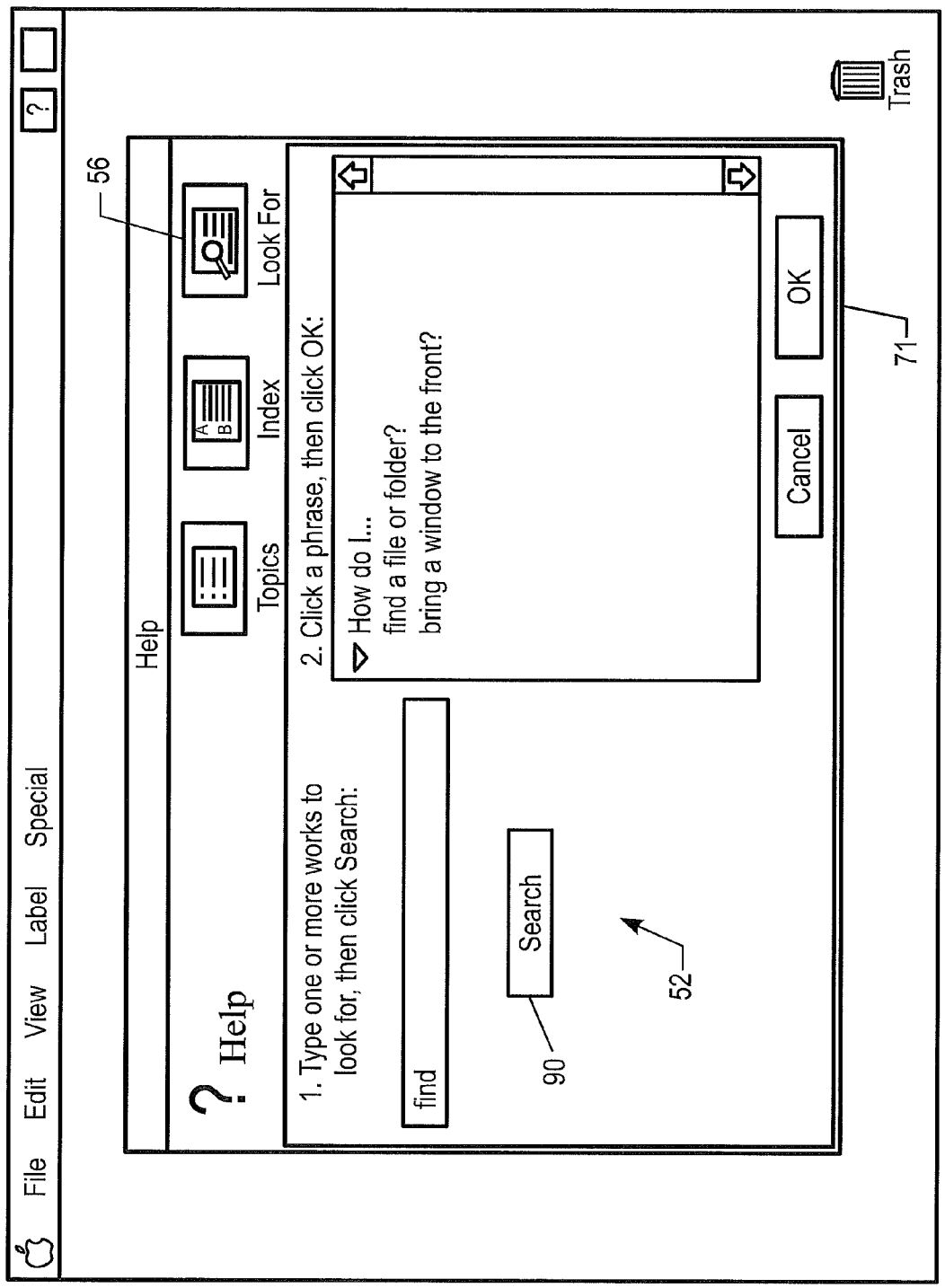

Still another way of getting the same information is through the "look for" icon (56). Clicking on the "Look For" icon will generate a search box (87), as shown in FIG. 9. The user types in the search request (in this case the word "file") and then presses the search button (90). This causes the CPU (16) to search the help database stored in memories (4) or (8) and return matching entries to working memory (20). The matching entries are displayed on the right-hand side of the access window of FIG. 10. The user selects one of the matching entries, and then presses the OK button (71), once again generating the detailed instructions shown in FIG. 4.

A.5 Coach Marks

Figure 11:
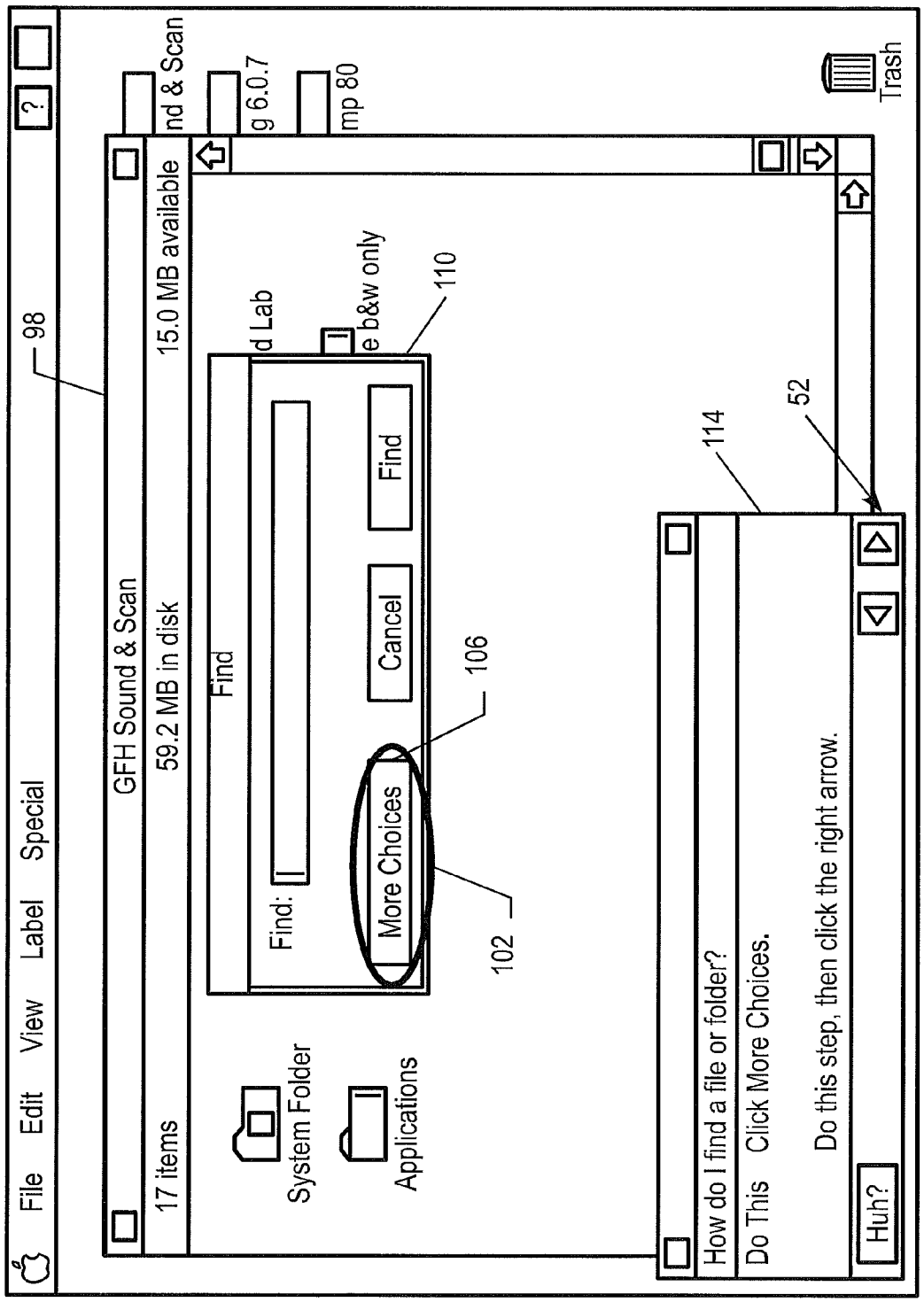
FIGS. 11-12 illustrate the use of "coach marks" to highlight instructions to a user.
Figure 12:
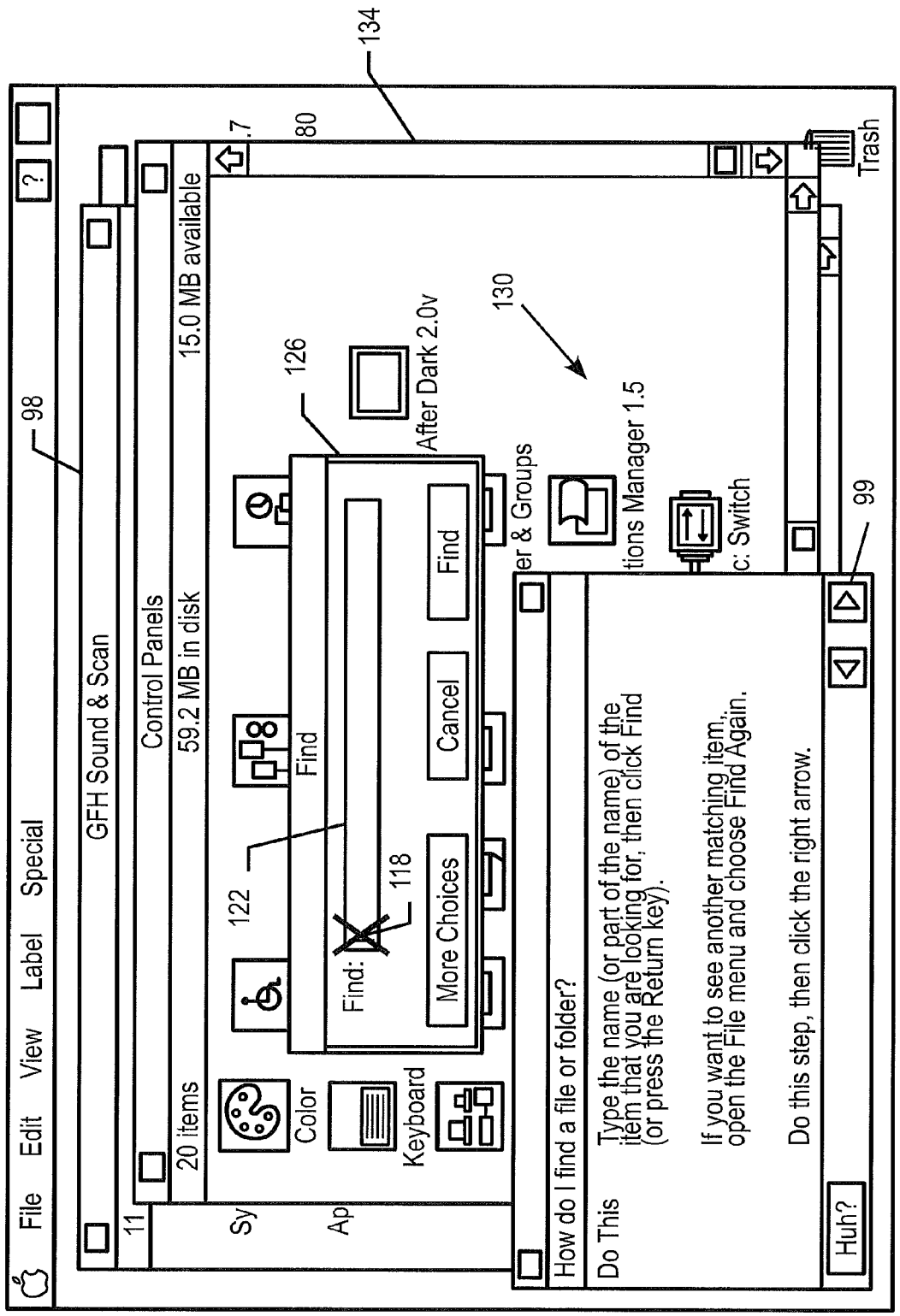

Returning now to FIG. 4, suppose the user wanted to continue further in obtaining information about the topic "How do I find a file or folder". If so, the user may click on one or more boxes in panel (74). This will cause the display of panels (110) and (126) shown in FIGS. 11 and 12, respectively. Note that these panels include graphical "coach marks" (106) and (118) respectively. The coach marks are designed to assist the user in correlating the textual instructions in the help panels (114) and (99) with relevant portions of the application display interface. For instance, coach marks highlight features (102) and (122) in FIGS. 11 and 12, respectively. Furthermore, the coach marks are not displayed simultaneously with the generation of the help panel, but appear a short time after the help panel is displayed. This is designed to draw the user's attention to the coach marks. To this end, the coach marks are also in a freehand type of script, which further highlights the coach marks from other display objects on the screen.

A.6 Internal Organization

Figure 2:
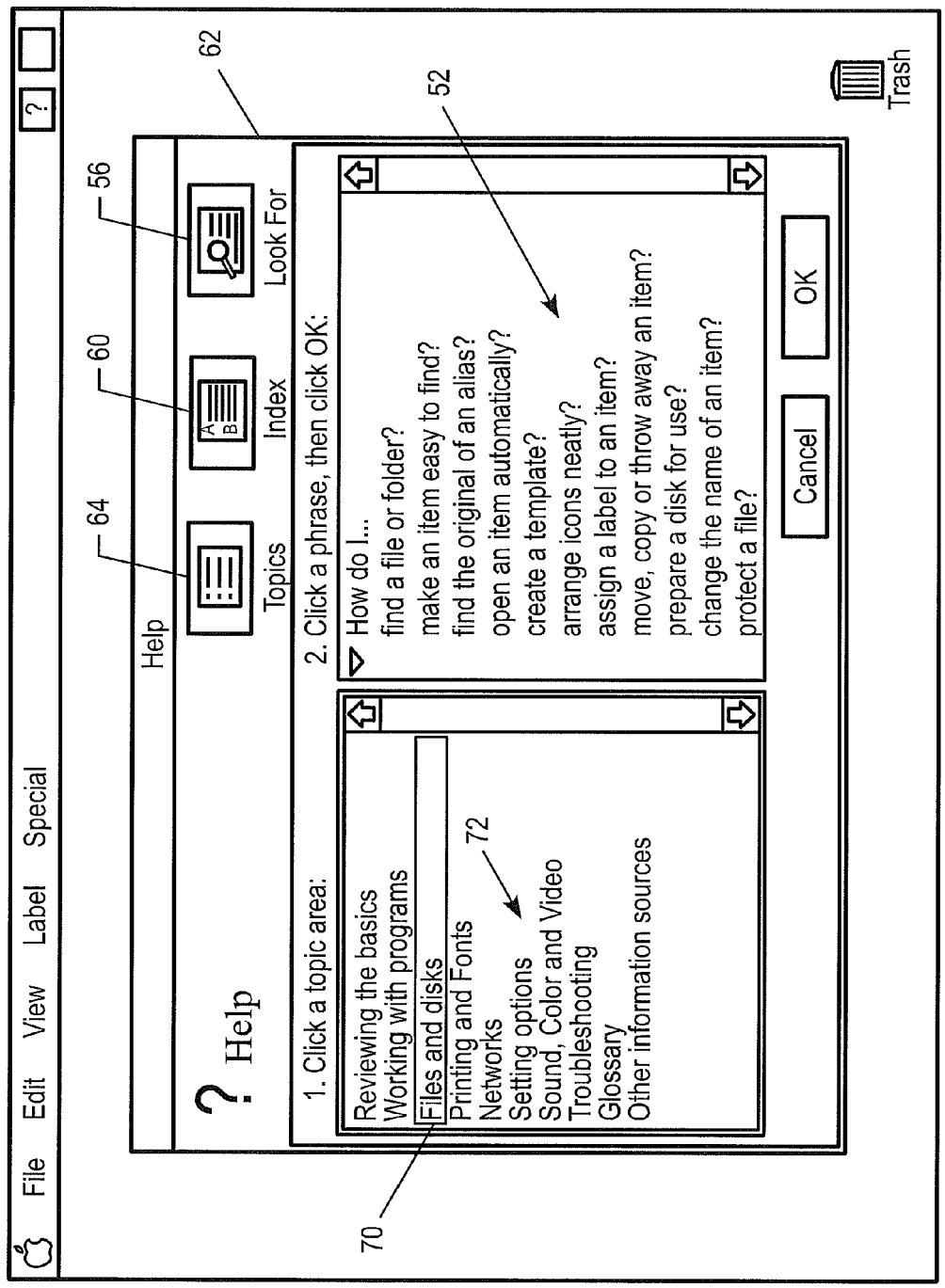
FIGS. 2-4 illustrate exemplary windows for accessing guidance information using a "topics" search.

Note from the preceding discussion that the panels relating to a specific query were presented in specific order, referred to herein as a "sequence". For example, as shown in FIG. 2, the questions "find a file folder?", "make an item easy to find?", "find the original of an alias?", etc. in the right-hand display column may each comprise a series of panels laid out in a specific order. Accordingly, each of the questions may be regarded as a "sequence".

Figure 13:
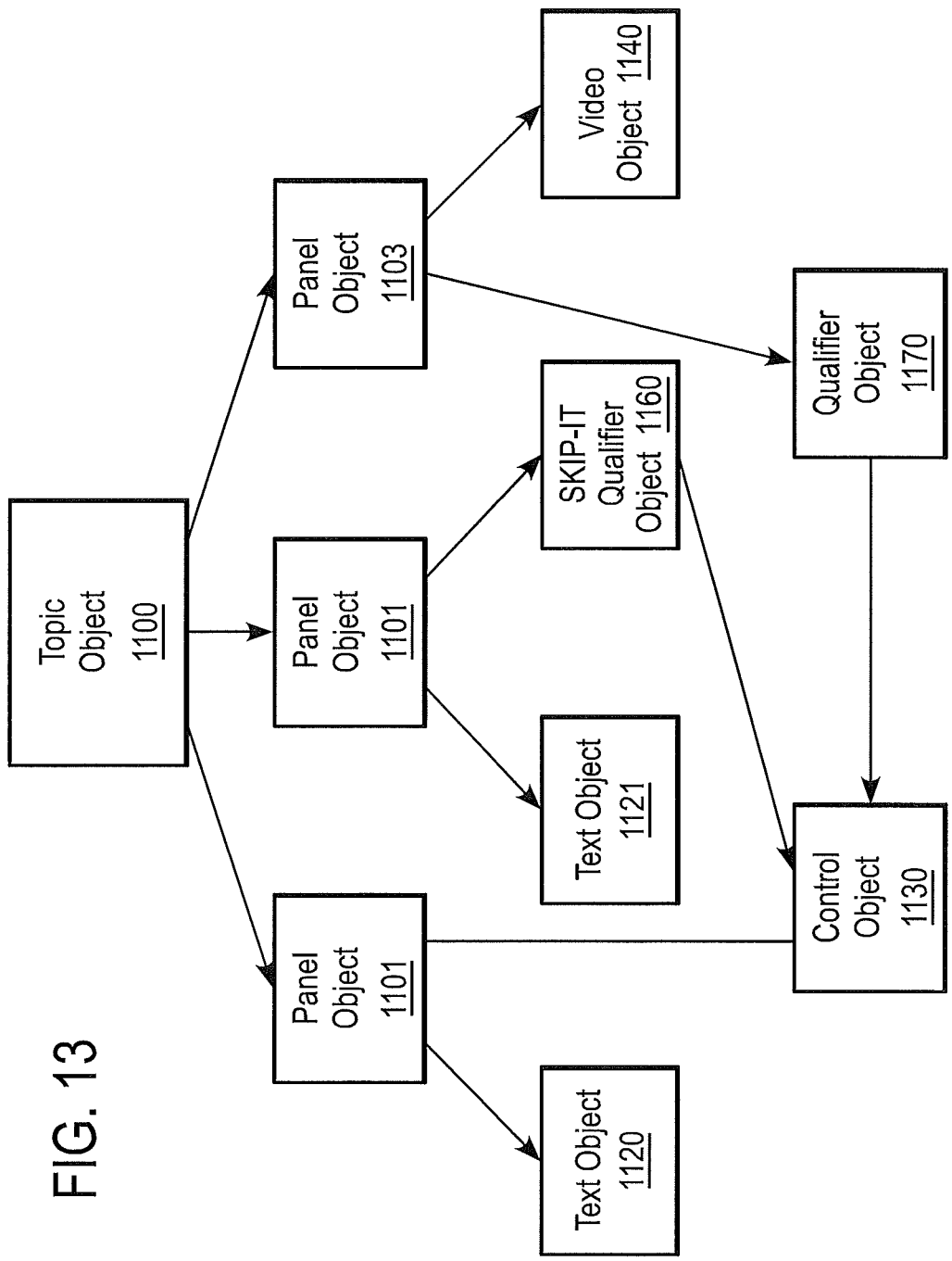
FIG. 13 illustrates an exemplary conceptual layout of the interrelationships between different display objects employed by the present invention.

The computer system preserves the interconnection between different panels by storing links to interrelated panels in a database (e.g. as stored in memories 4 and/or 8). The database may be conceptualized as having a plurality of component objects which are hierarchically ordered, as illustrated in FIG. 13. As shown there, a parent panel may be linked to several other child panels (as well as other display objects). And in turn, a panel itself may consist of many display objects which are hierarchically linked to the panel object. The panel objects may include text objects, graphic objects, prompt objects, control objects, and qualifier objects. In a preferred embodiment, objects may be used by more than one other object (e.g. object 1130 in FIG. 13). For example, a single item of text data may be used by multiple panels. This notion of re-use is one of the aspects of what is commonly referred to as object-oriented programming.

On a more global perspective, script files can be written which relate different sequences together. For example, the user guidance file, which consists of a great multitude of different sequence definitions, may be bound by a script file which describes the interrelationship between different sequences, and the manner for navigating from one sequence to another.

By way of simple illustration, consider the following script file:

```
<define sequence> "cow sequence"
    <panel> "how now"
    <panel> "brown cow"
<end sequence>        #Cowabung
<define panel> "how now"
    Hey Wow!
<end panel>
<define panel> "brown cow"
    Mooo!
<end panel>
```

The script file includes a sequence "cow sequence" which ties together two panels "how now" and "brown cow", which are defined latter in the script file. As will be apparent to those having skill in the art, script files are composed of a plurality of commands and definitions in a high level scripting language. Script files are conventionally generated with some type of text editor.

More details regarding the guidance interface itself may be obtained from the following commonly assigned patents and patent applications, the disclosures of which are incorporated herein in their entirety: U.S. Pat. Nos. 5,428,731; 5,469,540 and 5,488,685; Ser. No. 08/010,063 filed on Jan. 27, 1993 by Palmer et al. entitled "Method and Apparatus for Providing a Help Based Window System Using Multiple Methods"; Ser. No. 08/010,061 filed On Jan. 27, 1993 by Coleman et al. entitled "Method and Apparatus for Displaying and Scrolling Data in a Window-Based Graphic User Interface"; Ser. No. 08/056,367 filed on Apr. 30, 1993 by Brewer et al. entitled "Method and Apparatus for Generating and Displaying Visual Cues on a Graphics User Interface".

B. Guidance Editor

Figure 14:
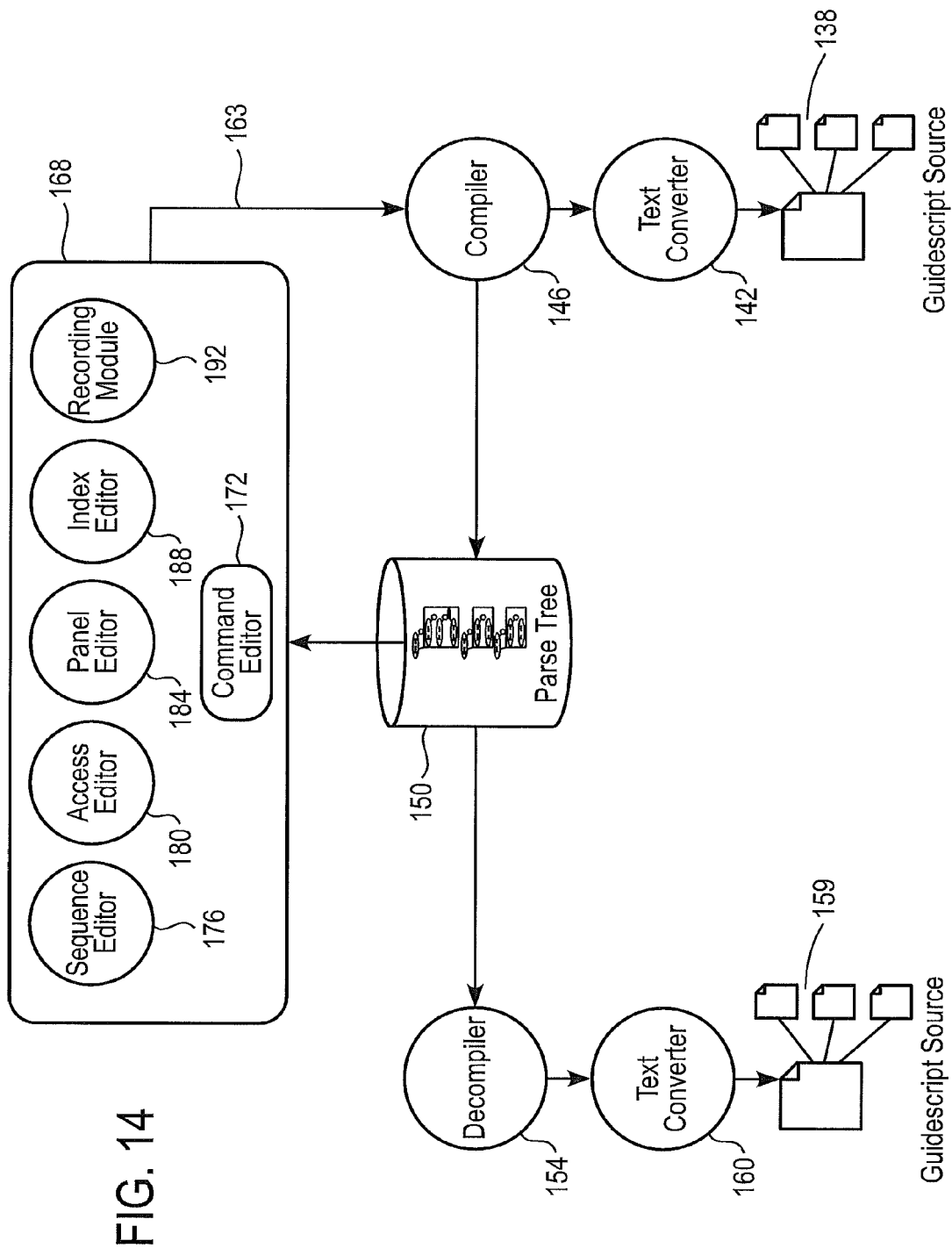
FIG. 14 illustrates the guidance interface editor according to exemplary aspects of the present invention.

The above described user guidance information is created using the editing and compiling system illustrated in FIG. 14.

A functional overview of the system will be presented first, followed by a detailed discussion of the principal editors.

B.1 Overview

As illustrated, editor (168) includes a plurality of interrelated editors. The editors include a command editor (172) for receiving and displaying a list of script file statements, a graphical sequence editor (176) for creating or modifying a sequence of interconnected guidance panels (and other objects); an access editor for creating or modifying an access window (e.g. such as window 62 in FIG. 2); a panel editor for creating or modifying a user guidance panel (e.g. such as the panel illustrated in FIG. 4); an index editor for creating or modifying index entries (such as those illustrated in area (86) of FIG. 5); and an editor recording module (192) for logging the editing operations performed by any one of the previously mentioned editors.

A script file may be input to the editor (168) in several different ways. For instance, the user can create a new script file using a "New" command under a "File" pull down menu (not shown) in the menu bar (32) of FIG. 1. Second, the user can open a previous saved editor script file using an "Open" command in the "File" pull down menu (not shown) in the menu bar (32). Third, the user may import an existing script source file using an "Import" command under the "File" pull down menu (not shown) in the menu bar (32).

A script file which was created by a text editor must be converted to parse tree format before loading into the editor. To this end, the script file (138) is sent to a text converter (142) and decompiler (146) for conversion from text editor format to object-oriented parse tree format (to be described below). Once in parse tree code format, the file may be loaded into editor (168).

Once a source file has been properly loaded, the document appears in the command editor. The command editor (e.g. FIGS. 15 and 16) displays a list of commands (187) contained in the script file in a scrolling window. However, only top level commands are displayed, such as <Define Panel> commands or <Define Sequence> commands. Any component objects within this list are embedded in the sequences and panels and are not shown.

The user may scroll through the list and choose a command which requires editing. For instance, the user may select a specific sequence entry in the script file by pointing to the sequence entry in the list. Double clicking on the sequence evokes the sequence editor (176).

Presuming a specific editor has been selected, the user then proceeds to perform editing. According to a particularly beneficial aspect of the present invention, all of the editors are interconnected and interrelated, such that the user can access any editor from any other editor. For instance, the user may start by invoking the sequence editor (176) which graphically lists a sequence of icons representing the components of a sequence. One or more of the components within the sequence may comprise panel icons representing panels in the sequence. By clicking on the panel icons a panel editor (184) is invoked. Furthermore, by "clicking" on a word in a text object in a panel in the panel editor, that word is added to the index for the current sequence.

The different editors allow the user to review a script program in a variety of different representations. If a user makes modifications to the script program in a particular representation, the system may automatically make corresponding changes in other representations. For example, if a user alters the script program using the graphical representation employed by the sequence editor, the system will make corresponding changes to the individual lines of script code, which may be reviewed using a text editor. In one embodiment, both graphical and textual representations may be presented simultaneously on the graphics display (using different windows, for instance). This allows the user to review, in real-time, how changes made in the sequence editor affect the text of the script program.

Figure 31A:
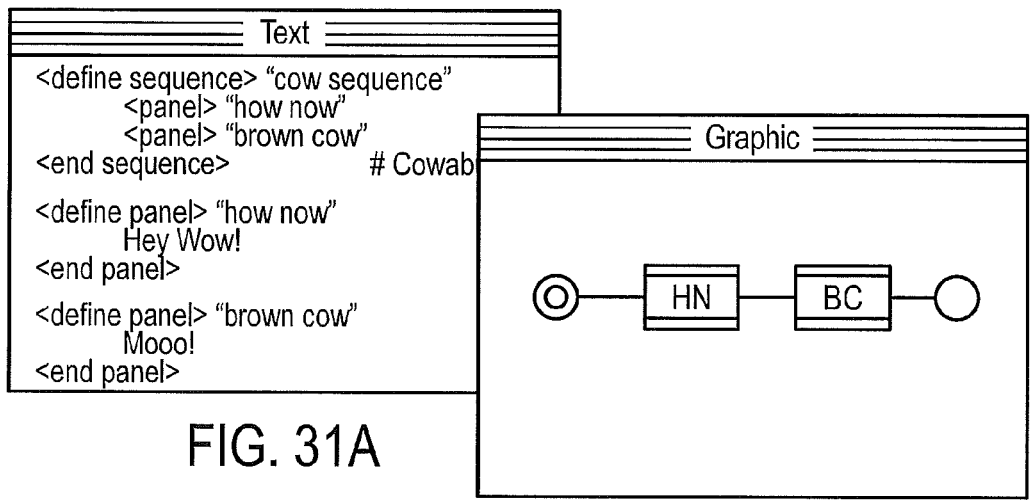
FIGS. 31A-C illustrate the display of a script file in both textual and graphical representations during an editing sequence.
Figure 31B:
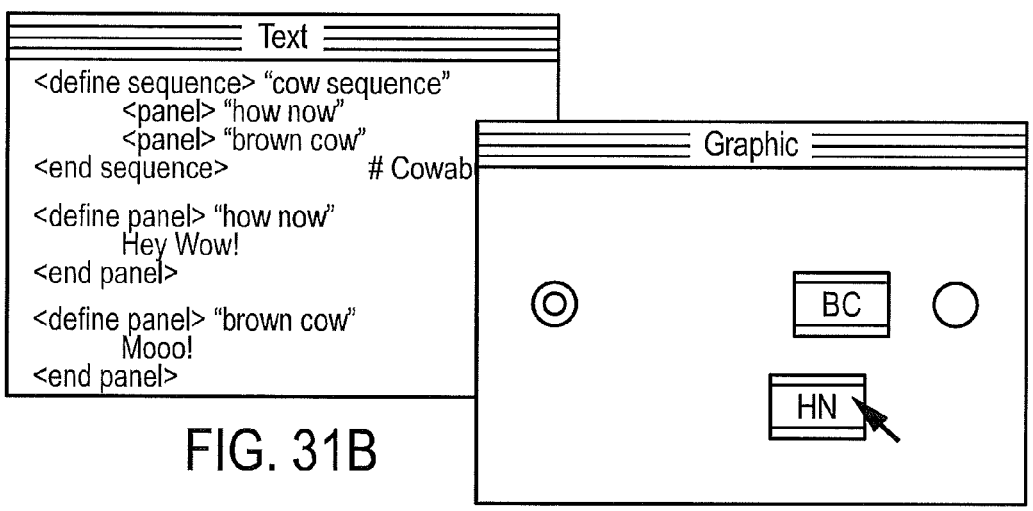
Figure 31C:
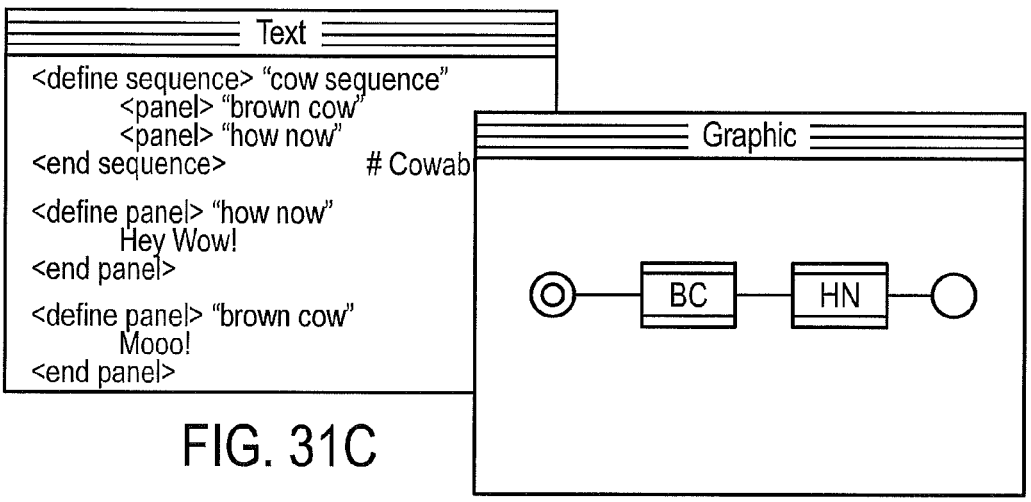

For example, FIG. 31A illustrates two windows which respectively display the textual and graphical representations of the relatively simple script file described previously. This script file comprises a sequence of two panels "how now" and "brown cow", whose icons are labelled HN and BC in the graphical representation. During editing, the user may desire to switch the order of the two panels. This can be done in the graphical representations by dragging and dropping one of the panel icons. The result of such an operation is shown in FIGS. 31B and 31C. When the script file is edited in the graphical mode, the resulting changes are automatically implemented in the textual mode as well, as shown in FIG. 31C. In this particular situation, the changes are carried out in the sequence editor 176, and the corresponding representations in the two modes are linked to one another. Thus, as the user moves and releases the icon HN to follow the icon BC in the sequence, the corresponding lines in the textual script are also moved.

Figure 18:
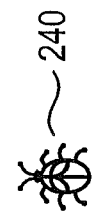
FIG. 18 illustrates an icon for storing compiling errors.

Once the user has finished editing or creating the guidance information file, the user closes out the relevant editor. The editor interface win then instruct the compiler (146) via connection (163) to recompile the information file, but only with respect to the portions that were amended. The recompiled portion is then added to the remainder of the parse tree file in a memory (150). If an error is detected during the recompiling process, the offending text is placed inside a file represented by a visual error indicator, such as a "bug" icon (240) of FIG. 18. Compilation then continues until the end of the file is reached. At this time, double clicking on the bug icon will display the offending text, which may then be edited and corrected. This corrected portion is then recompiled. If successful, the bug icon is extinguished. This process greatly improves the efficiency of program creation. In the prior art, an error in the compiling process would typically require the entire file to be recompiled.

If the user wishes to convert the parse tree file back to a text editor format (159), he may decompile the file using decompiler (154) and text converter (160). For instance, the user may desire to use the script file in an application that requires that the file be in a text editor format. More specifically, a document may be exported using an "Export" command contained within the "File" pull down menu (not shown) of menu bar (32).

B.2 Command Editor and the Parse Tree Format

Figure 15:
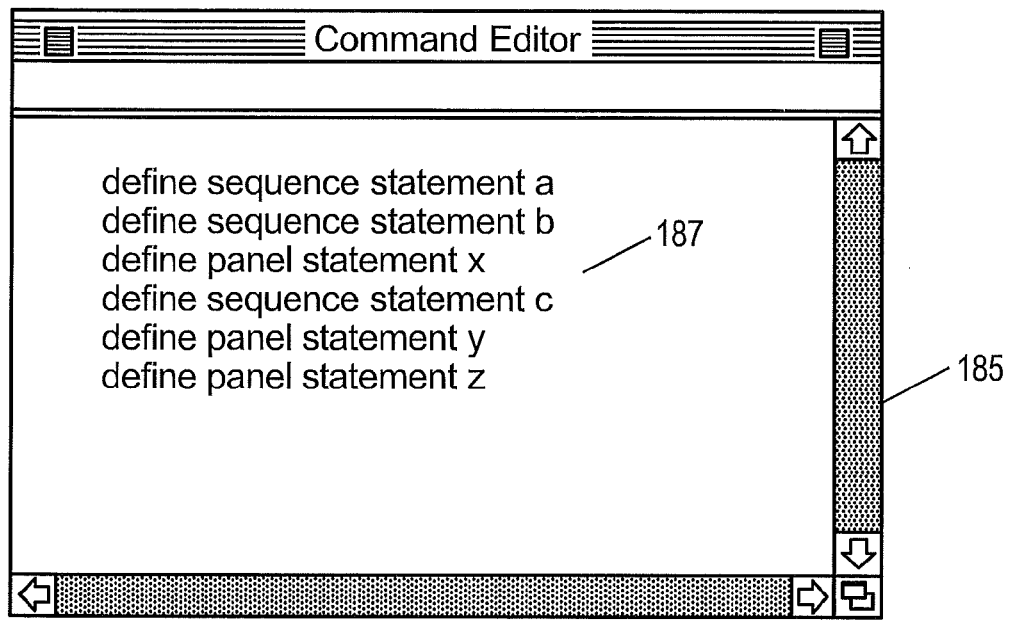
FIGS. 15-16 illustrate the command editor interface according to exemplary aspects of the present invention.
Figure 16:
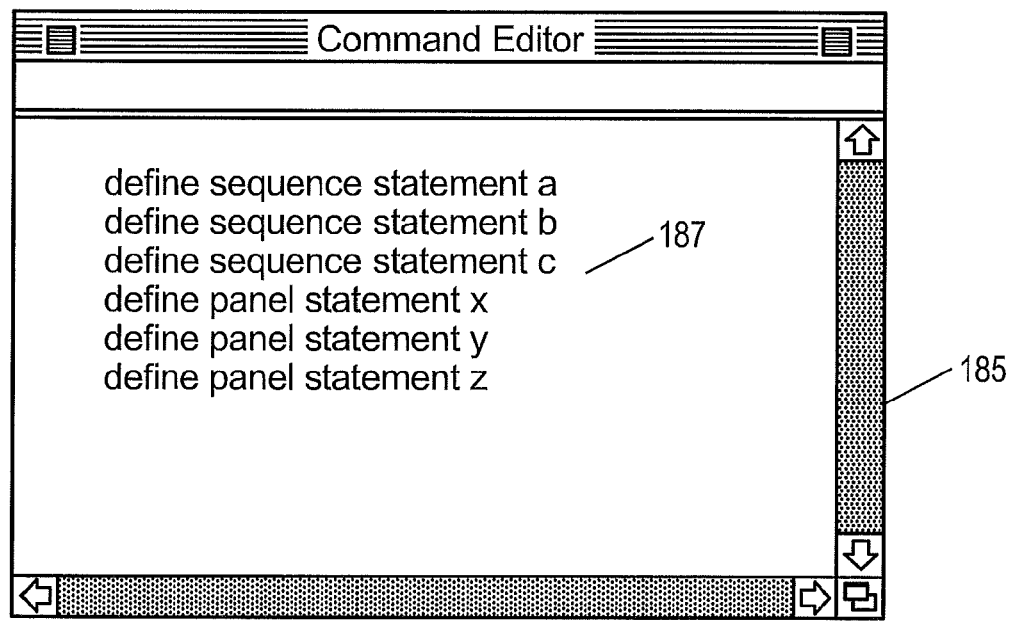

The command editor serves as an initial gateway through which other editors may be accessed. The command editor, as illustrated in exemplary FIGS. 15 and 16, is initially invoked when the user loads a file in parse tree code format into the editor (168). The command editor responds to the loading of the file by displaying an annotated list of statements (187) contained within the script file in window (185). In the specific embodiment in FIG. 15, the script file contains three define sequence statements (a), (b) and (c), and three define panel statements (x), (y) and (z). Each of these statements may include associated embedded script information. However, only the "top" or "main" commands are displayed to facilitate rapid review of the script file. By way of illustration, the command editor would not display the indented information under any of the main <define sequence> and <define panel> commands illustrated in the sample script program of FIG. 27. It should be noted that the statements (187) included in window (185) are not intended to represent any type of presentation format or syntax. The statements have been shown in generic format to so as not to obfuscate the discussion with unnecessary detail.

To further facilitate review of the script file, the command editor can, at the request of the user (e.g. by appropriate menu selection) reorganize the information within the command window. The commands may be sorted, such that all of the <define sequences> are displayed first, followed by all of the <define panels>. This is illustrated in FIG. 16. Alternatively, upon the command of the user via appropriate menu selection, the command editor can filter the file by only presenting certain types of program elements (not illustrated).

As mentioned, once the editor (168) is closed, the script program which was modified is recompiled to parse code format. The conversion may be best understood with reference to FIGS. 27-30.

Figure 27:
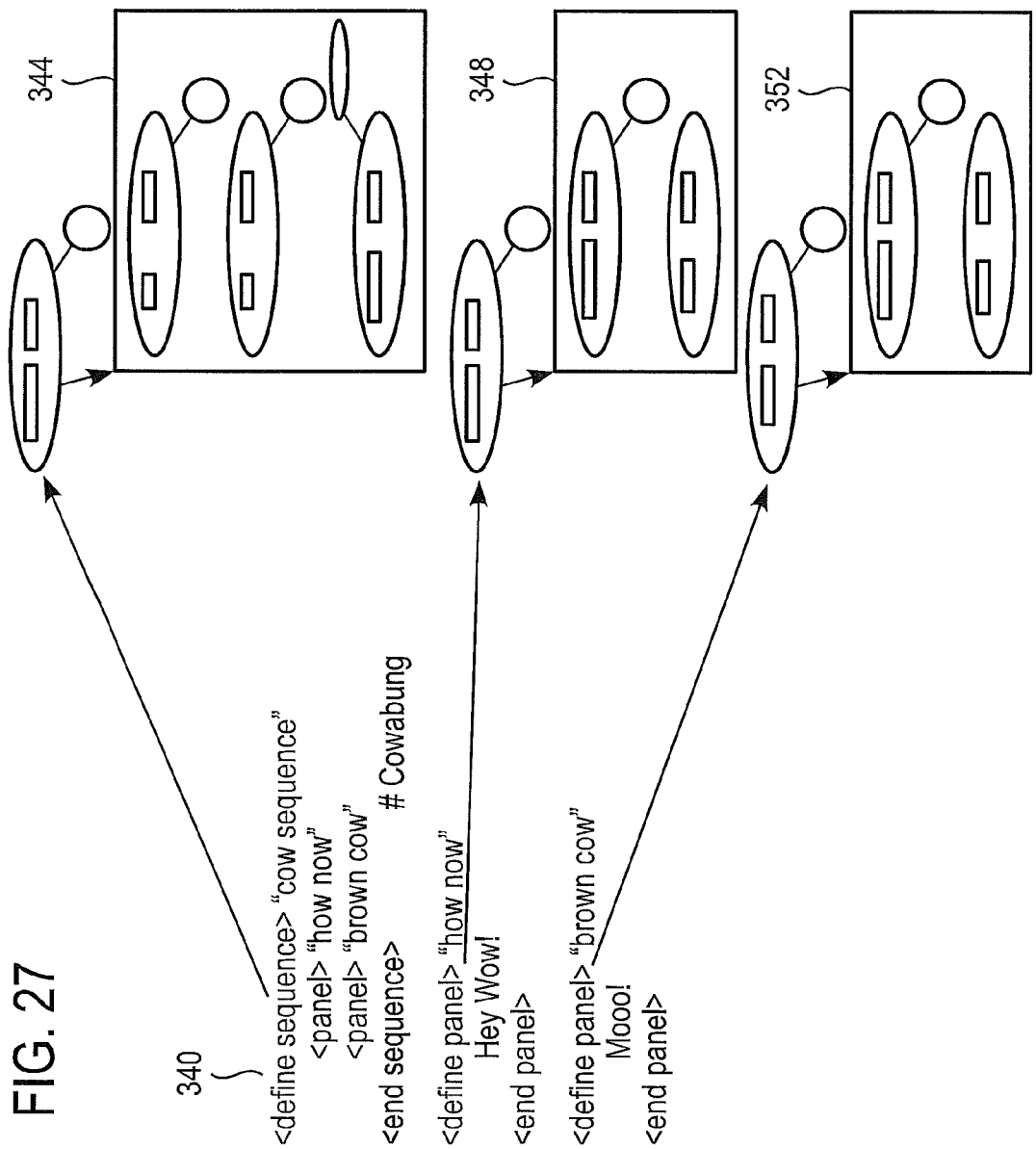
FIGS. 27-30 illustrate exemplary parse code information generated by the compiler of the present invention.
Figure 28:
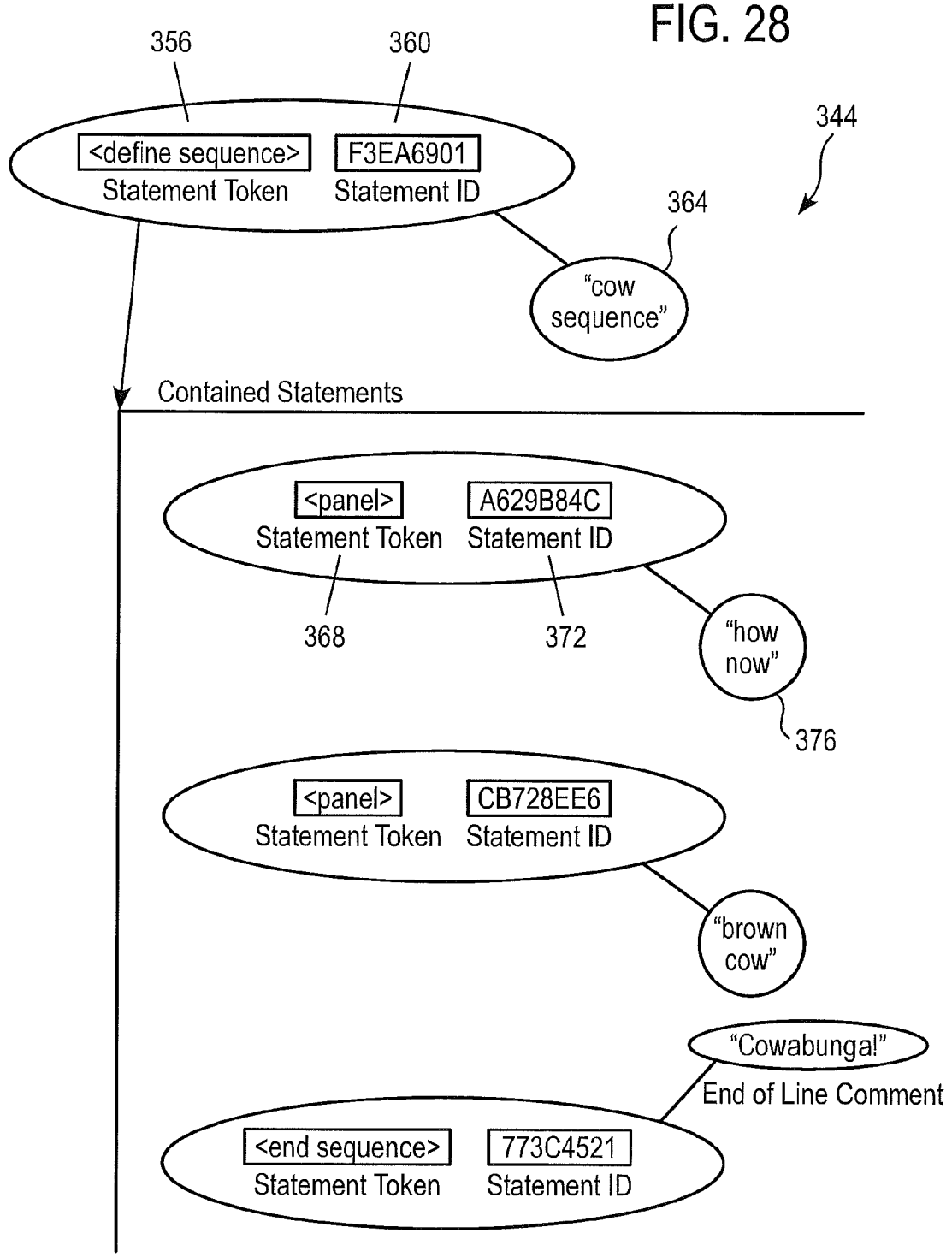
Figure 29:
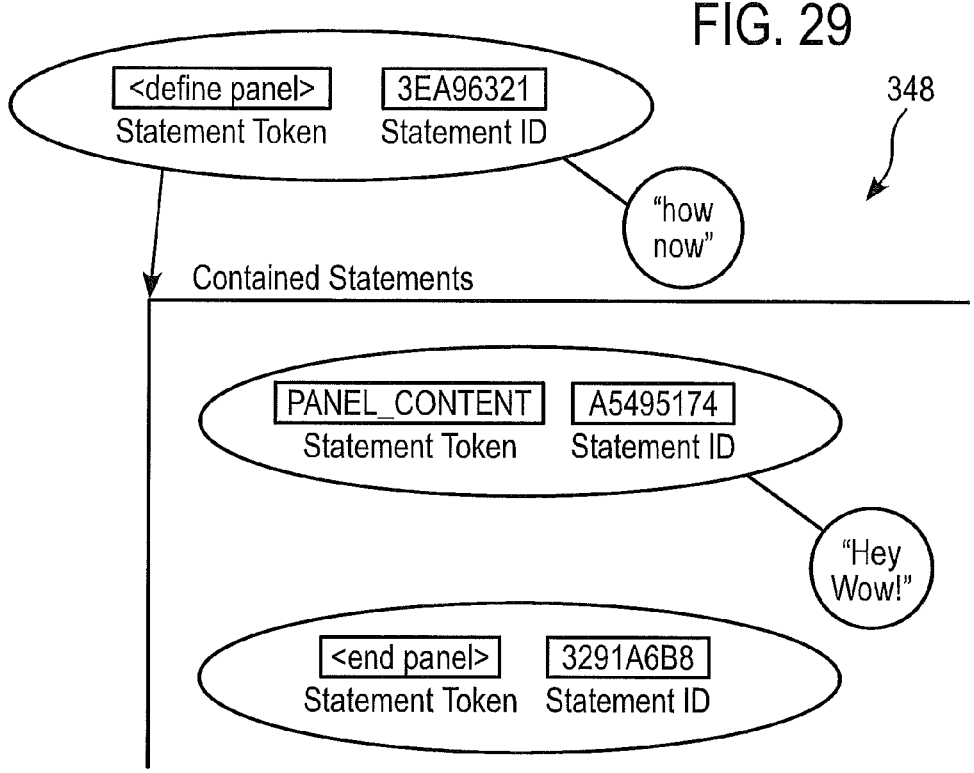
Figure 30:
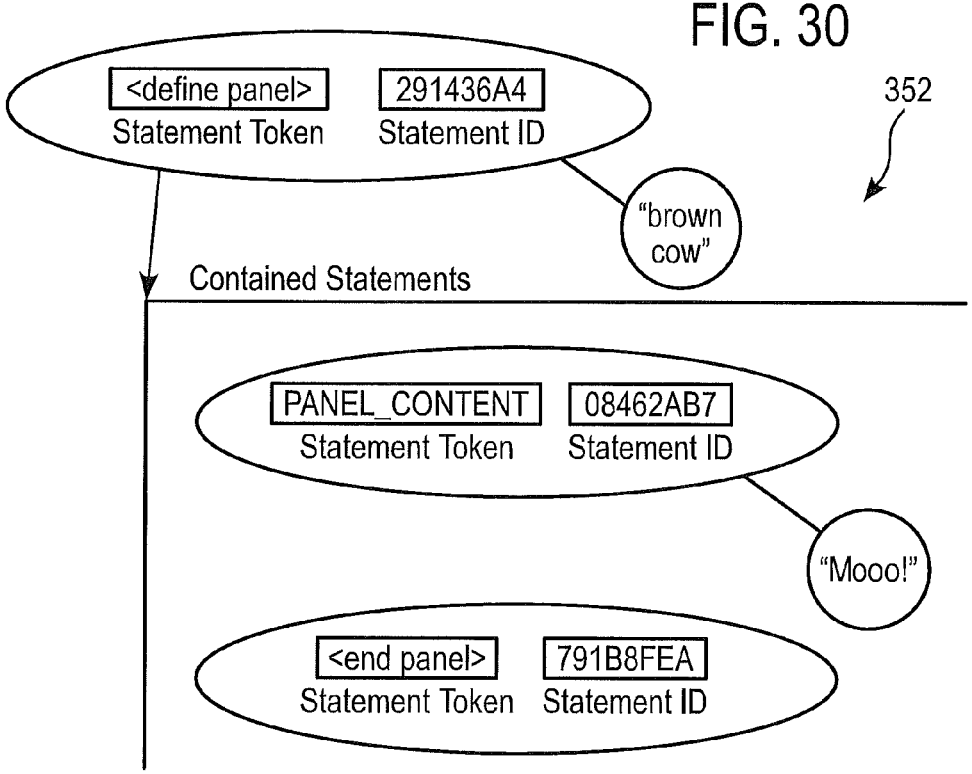

An exemplary parse tree is illustrated in FIG. 27 corresponding to the above described script file (340). Each definition block of the script (340) is broken into corresponding blocks (344), (348) and (352). As shown in FIG. 28, the topmost block (344) is enlarged for discussion purposes. As shown there, the <define sequence> and <panel> statement tokens (356) and (368) have appended thereto statement IDs (360) and (372). These statement IDs are useful in tracking changes made in a script source file from one revision to the next, as will be discussed in connection with the Localization Tool. The actual textual objects associated with the compiled statements are indicated as objects (364) and (376) respectively. FIGS. 29-30 show an enlarged view of the remainder of the script parse tree. The parse tree elements in FIGS. 29-30 are based on the same organizational premise identified with respect to FIG. 27.

Furthermore, the internal format of the parse tree is tokenized. Strings that are repeated in the source are factored into a single string in a table. Occurrences of the string are replaced with token IDs which require less space.

B.2 Sequence Editor

The sequence editor allows the user to graphically define the relationship between the component objects of a particular guidance help sequence by stringing together a series of icons representing the components.

Figure 17:
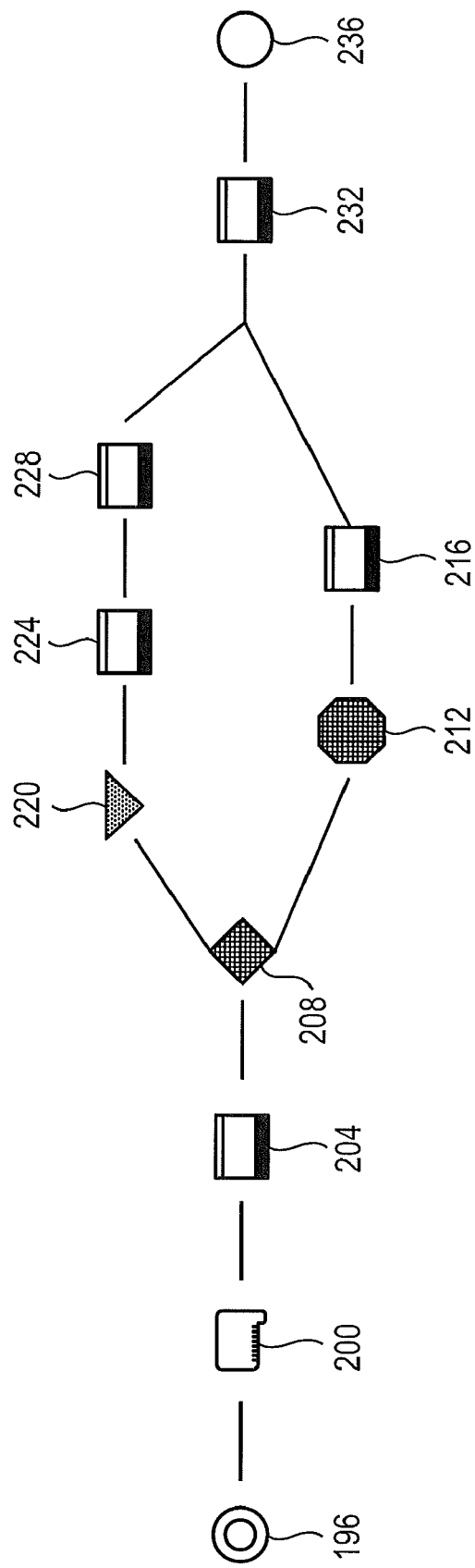
FIG. 17 illustrates the sequence editor according to exemplary characteristics of the present invention.

As illustrated in FIG. 17, the components of a particular guidance help sequence may include a series of panel objects (204), (224), (228), (216) and (232). For example, panel object (204) might correspond to the specific panel shown in FIG. 4. Other sequence objects correspond to modules of script code, each of which preferably implements a common display interface function. These modules are referred to as "plug-ins". For example, plug-in (212) defines a series of control statements which may carry out the common interface routine where a user is queried "Are you sure you want to continue?". Plug-in (208) implements an "if" program statement, while plug-in (220) defines a "skip-if" program function. Plug-in (200) allows the programmer to attach a comment to the sequence, which may for example present an overview of the functionality of the sequence. Last, plug-ins (196) and (236) define the beginning and end of the sequence.

Figure 19:
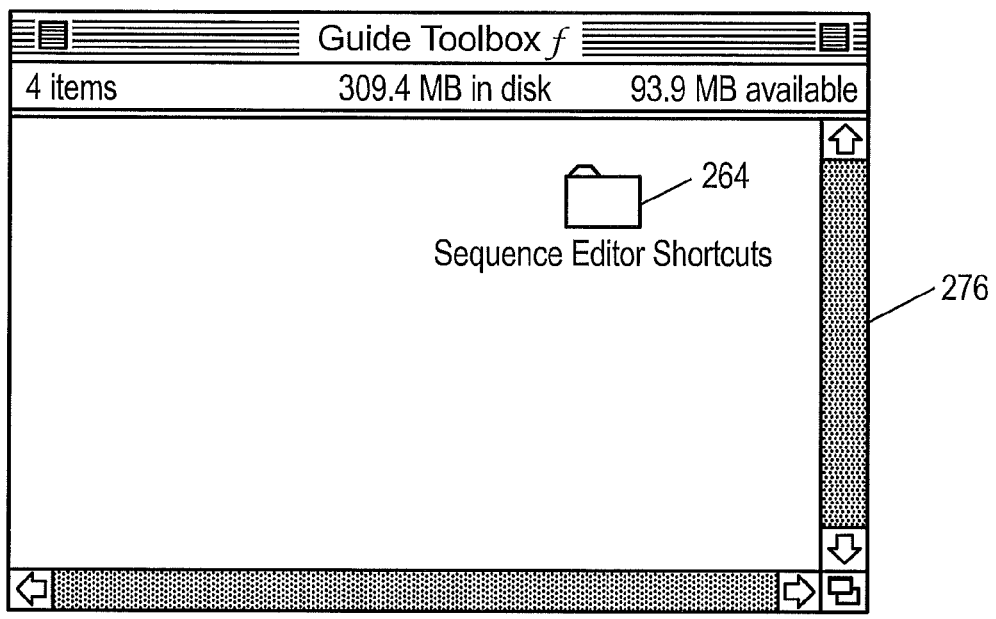
FIG. 19 illustrates various files containing shortcut plug-ins for different editors.
Figure 20:
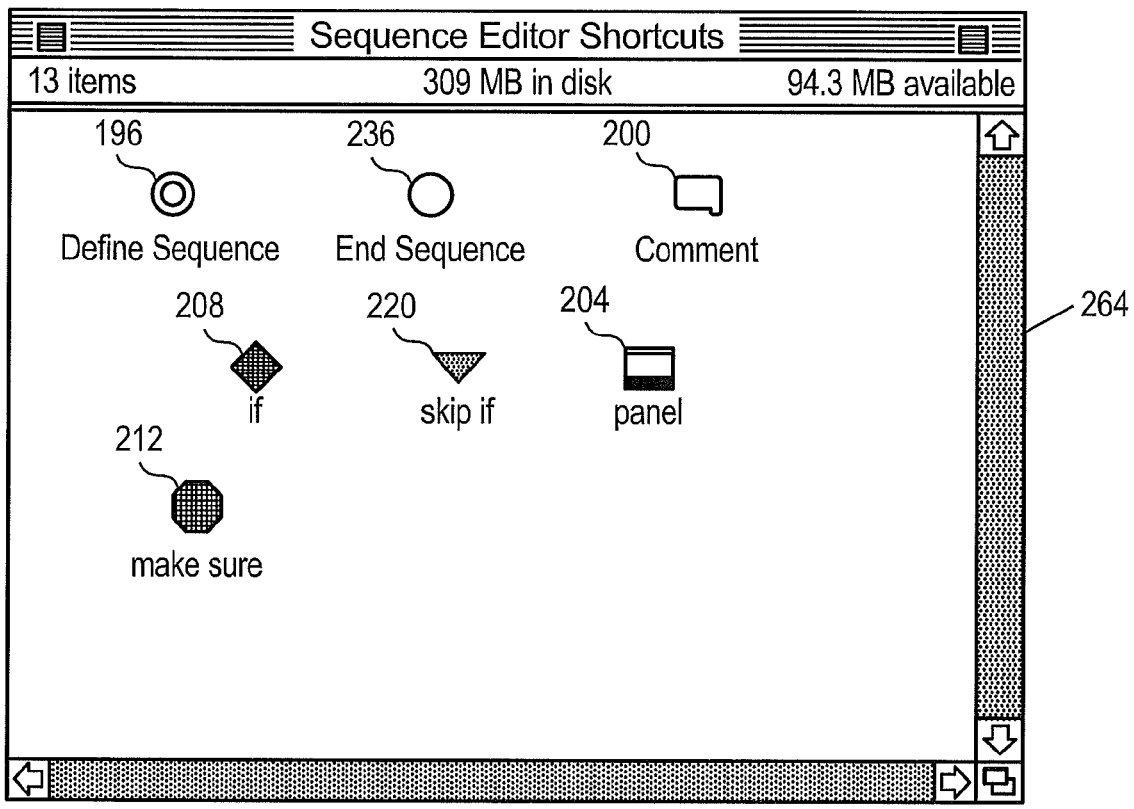
FIG. 20 illustrates various plug-in modules for insertion into the sequence representation illustrated in FIG. 15.

The above listing of plug-ins is obviously exemplary in nature. It will be apparent to practitioners in the art that other types of plug-ins will be useful. In fact, the individual user may maintain a customized list of plug-ins providing the panels and script modules which he or she uses most often. This customized list may be associated with the sequence editor shortcuts folder icon (264) shown in FIG. 19, or whose opened contents are illustrated in FIG. 20.

In operation, the user may string together a series of panels (e.g. 224, 228, etc) and script plug-in modules (e.g. 208, 212, etc.) using the graphical interface of the sequence editor. For example, if a pre-existing sequence is displayed, the user can add to the sequence by dragging icons from the sequence editor shortcut panel window (264) to the sequence of icons in the sequence editor. MoFe specifically, suppose that at the time the user started editing, only icons (196), (200), (204) and (208) were in place. At this time the rightmost icon (208) defining an "if" statement would include two "wires" emanating therefrom. To add to the sequence, the user may access the shortcut window (264) and drag desired icons (representing panels or short listings of script code) to the sequence editor screen. The user would then "drop" the icons onto the terminal ends of the "wires" emanating from the "if" statement.

According to particularly beneficial features of the present invention, the user may use the graphical sequence editor as a springboard to perform further editing on individual display plug-ins within the sequence. For instance, the sequence shown in FIG. 17 includes a plurality of panel objects (204), (224), (228), (216) and (232). By clicking on any on of these modules the user invokes the panel editor (to be discussed below), whereupon the user can performing editing on the panel display objects.

Figure 21:
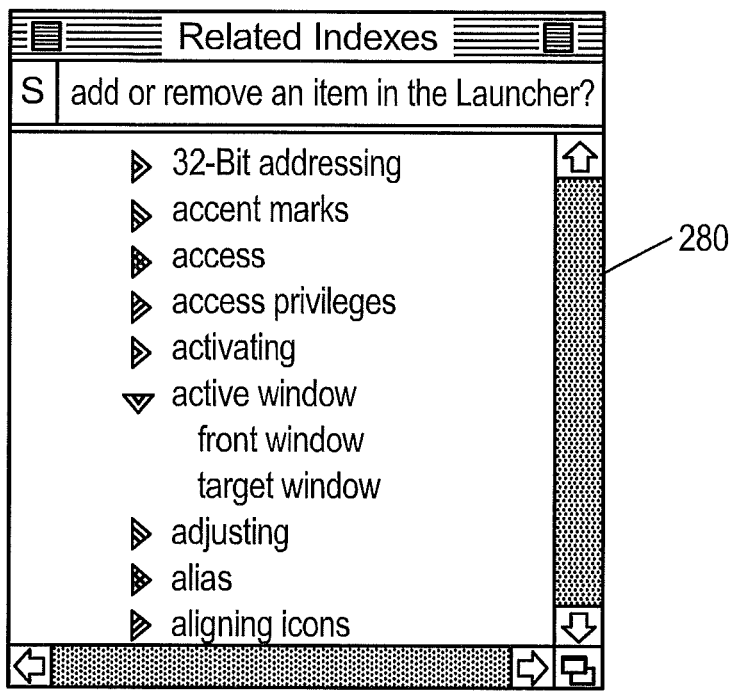
FIG. 21 illustrates an index editor summoned from the sequence editor interface.

Alternatively, the sequence editor may interface with the index editor (to be discussed below) through appropriate menu command. This will evoke an index editor window (280 as shown in FIG. 21) showing index terms relating to the displayed sequence. The index editor interface will be discussed further below.

B.3 Panel Editor

The panel editor allows the user to edit an existing panel using a series of three windows. As used herein, the term "panel" refers to a data set associated with a display presentation, an example of which is illustrated as panel (74) in FIG. 4. The first of the three windows, the "Panel Palette Window", allows creation of new elements in the sequence. Specifically this window allows for the creation of all of the elements associated with a panel, including (but not limited to) title, text objects, graphical objects, video sequences, radio buttons, check boxes, picture buttons, and the like.

Figure 22:
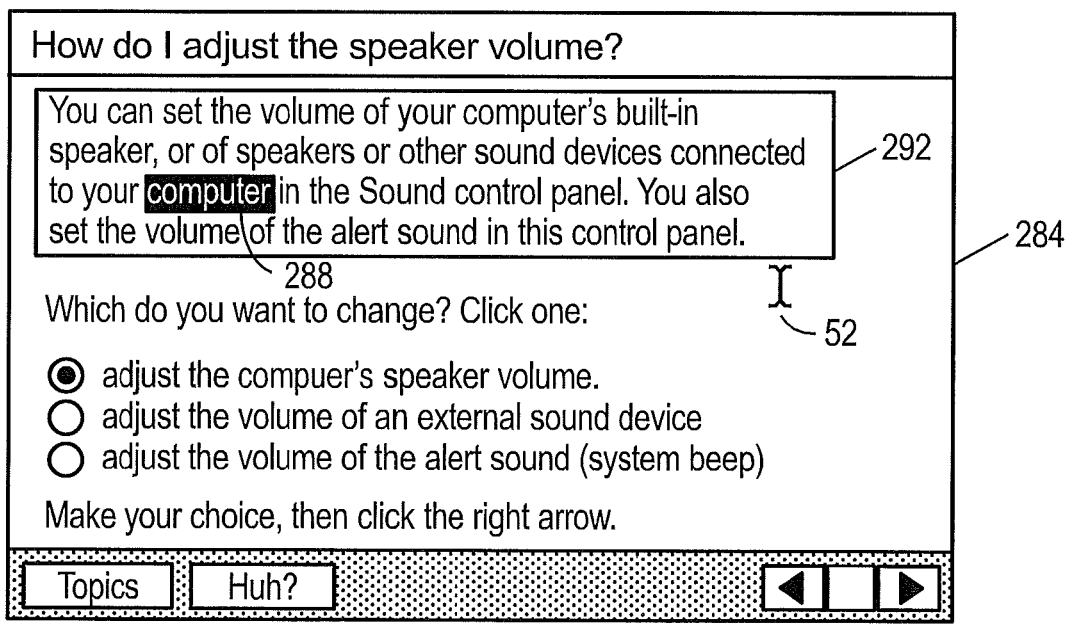
FIG. 22 illustrates the panel editor according to exemplary aspects of the present invention.

The second window is referred to as the "panel window". An exemplary panel window (284) is illustrated in FIG. 22. As shown, the layout of the panel window is similar in appearance to the window which is presented to the user during the user guidance dialogue. In other words, the editor employs WYSIWYG (what-you-see-is-what-you-get) format to perform editing. Clicking on any text object within the panel enables a user to edit the object. For instance the user in FIG. 22 has highlighted the word "computer" (288) in the text box (292). The user may then modify the text, resize the text or move the text to a different location.

Other display objects within the panel display may be edited in an analogous fashion. Double clicking a button brings up a window to edit the event associated with that button. Double clicking on a picture brings up a graphical object window. Dragging a graphical object from a graphical object window to a panel replaces the existing graphical object in the panel with the new graphical object from the object window. Similarly, dragging a coach mark from a coach mark object window to a panel attaches that coach mark to the panel.

If the panel happens to be a shared panel (as discussed above), then changes to the shared panel occur globally to all panels. The shared panel preferably has a different color in the window's title bar to remind the author that this is a shared panel. If the user is not certain whether a panel is shared, he may investigate this matter through the panel editor interface, which identifies shared objects.

Last, the third window in the panel editor interface provides for the editing of events associated with a panel (e.g. create a panel, show panel, close panel, etc.).

B.4 Access Editor

Figure 25:
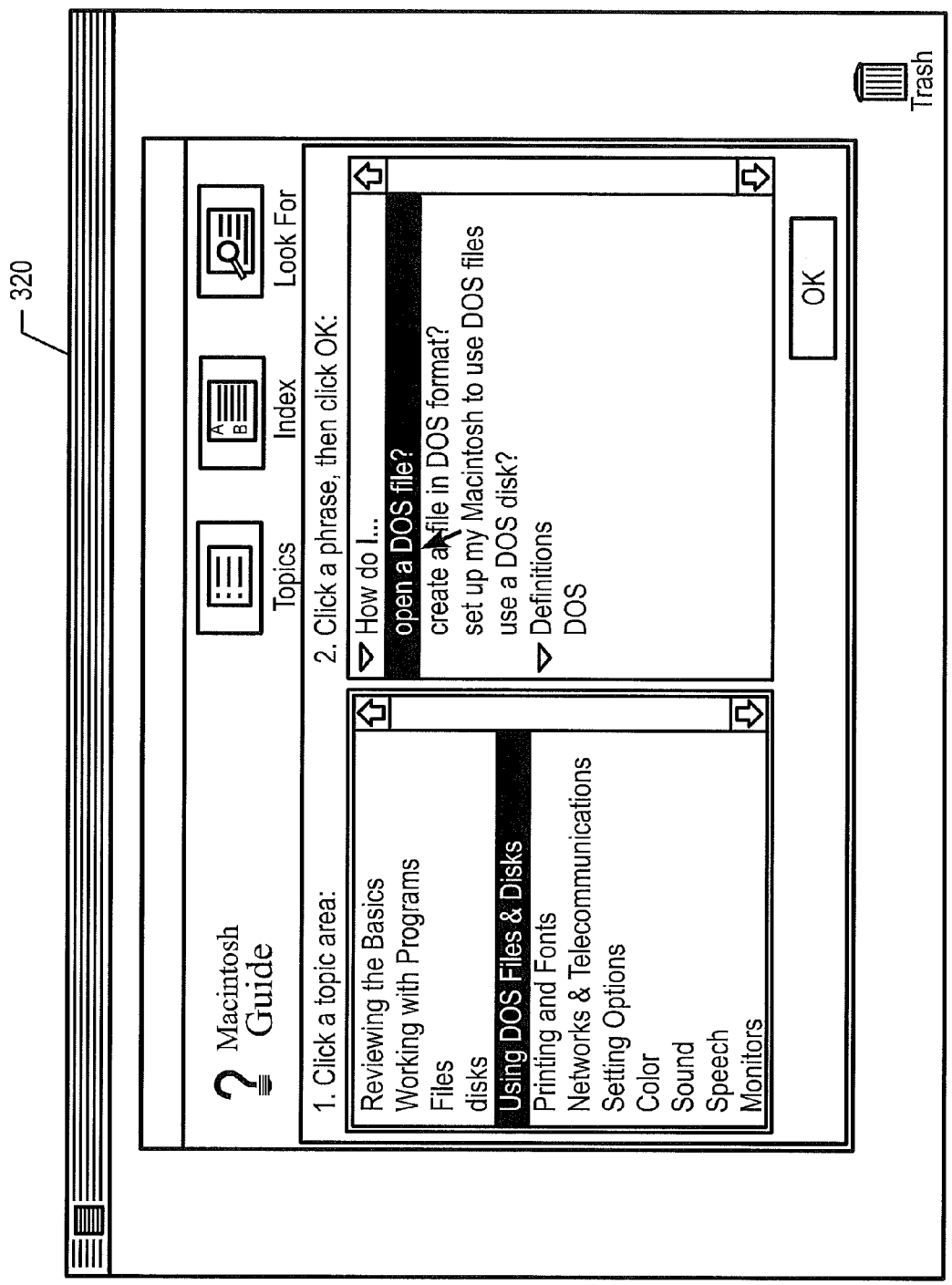
FIG. 25 illustrates an access window editor according to exemplary aspects of the present invention.

FIG. 25 illustrates the access editor, which allows the user to edit the access window (320) for the guidance file. This interface allows a user to change all global database properties affecting a database. In operation, the user activates a "Get Database Properties" menu item, causing the CPU (16) to present a dialog box. The user may select various global data base properties through the dialog box.

Clicking on any text object in the access window (320) allows the user to edit that object. Dragging a graphical object from the graphical object window to a graphical object in the access window replaces the existing graphical object with the new graphical object.

To reorder the sequences in the sequence list, the user may drag the sequence to the desired location. To reorder the headers in the sequence list, the user may drag the header to the desired location. To reorder the topics in the topic area list, the user may drag the topic area to the desired location.

To create a new sequence the author chooses a "New Sequence" menu entry (not shown) from the menu bar. A default sequence with one panel is then created, from which the user may then modify and build upon. To create a new header the author chooses a "New Header" menu entry (not shown) from the menu bar.

B.5 Index Editor

The index editor (312) allows the author to edit individual entries in the index of the guidance file. As shown in FIG. 23, the index terms are listed in the scrollable region of window (312) located beneath the legend "index term". The arrows (300) to the right of the index terms allow the author to view synonyms for the index term. That is, by clicking on an arrow, the user is presented with synonyms for the associated index term. The column to the right of the index terms lists "hidden names". Hidden names are used in a variety of contexts, such as in storing Japanese index terms. Japanese text may by represented in Kanji notation or in phonetic notation. Thus for an index term in Kanji notation, a hidden name for the index may be defined as its phonetic equivalent. This is useful as often different forms of Chinese characters are difficult to manipulate using a computer. The manipulation is performed on a more manipulable counterpart to the index, such as its phonetic equivalent.

To add an index term, the author selects a "New Index" menu item (not shown) from a menu bar. To edit a hidden name, the author clicks on the hidden name. The word "none" in italics indicates that there is no hidden name. To add a synonym, the author selects the index term and chooses a "New Synonym" menu item (not shown). To delete a hidden name, index or synonym, the author selects the term by clicking and then hits the delete key.

The user may associate an index term with a particular sequence by dragging an index term from an object window to the appropriate sequence in a sequence object window. Alternatively, the user may create the association by dragging the sequence term from its object window to the appropriate index term in its index object window.

By "clicking" on a word in a text object in a panel in the panel editor, that word is added to the index for the current sequence. If the author clicks on a selection of words, then that selection becomes an index entry. The author may also drag a text selection from a panel editor window to an index editor window, and the appropriate index terms will be created.

To view what sequences are connected to an index, the user may choose the "Related Objects" menu entry. A window (316) will appear listing the index entries which are associated with a main index, as shown in FIG. 24. The user may remove an assignment of an index to a sequence by selecting the sequence and choosing a "Remove Index" menu entry (not shown).

The index editor can be used to generate index terms for every item in a sequence or database by using a "Generate Index" menu entry (not shown). In response to activating this command, the index editor will add an index term for every word in the sequence or database. The user may specify a stop word list which specifies words that are not to be included in the index. Words in the sequence are compared with words in the stop list, and not assigned an index term if they match a word in the stop list.

B.6 Localization Tool

Figure 26:
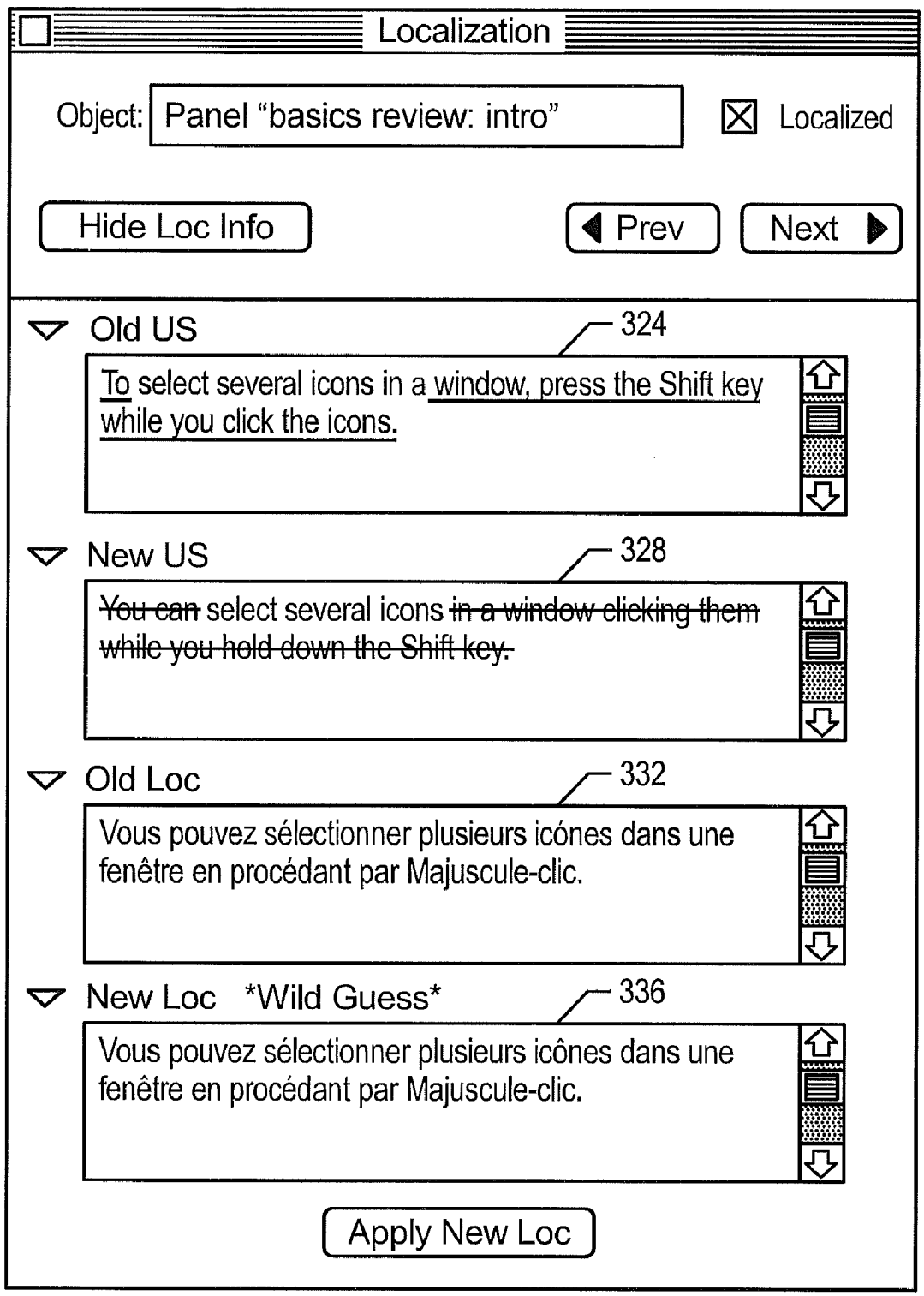
FIG. 26 illustrates a localization tool window interface according to exemplary characteristics of the present invention.

A further beneficial feature of the present invention, although not illustrated in FIG. 14, is the localization tool. As shown in FIG. 26, this tool allows the user to update a foreign message help guidance database in response to a prior (old) U.S. panel (324), a new U.S. panel (328), and the prior (old) foreign panel (332). The general goal is to create a new foreign panel (336) which models the change between the old U.S. panel (324) and the new U.S. panel (328).

In operation, the user may invoke the localization tool through the command editor interface (such as by clicking on a menu entry devoted to the localization tool). In response thereto, the CPU (16) generates the window illustrated in FIG. 26 with text areas (324), (328), (332) and (336) initially empty. The user may then load particular source guidance files corresponding to "old US", "new US" and "old loc". The file "old US" corresponds to an original source file with textual material in the English language, while the file "old loc" corresponds to an original source file with textual material in some language other than English, such as French. The file "new US" corresponds to a subsequent revision of the "old US" document. As mentioned the general goal is to compare, for each textual message, the "old US" file with the "new US" file. Changes should be made in the "new loc" file which correlate with the nature of the change made in the "new US" file. This process is referred to as localization. A user who performs this task is referred to as a localizer.

The localization tool performs its comparison between U.S. and foreign files by matching statements which share the same IDs. As shown in FIGS. 26-28, each statement in a source file produced by the present invention includes a statement ID (e.g. 372 in FIG. 28). The user may sequence through different commands by activating the "Prev" and "Next" commands shown in the upper right-hand corner of FIG. 26. The button "Hide Loc Info" allows the user to display only the top block of the localization window (e.g. thereby not displaying the U.S. and loc. files).

As a matter of practice, however, different situations will arise that make it difficult to determine what textual statement to use in the "new loc" window. For example, there may be a textual entry for a statement in the "new US" file, but not in the "old US" file. To cope with these problems, the present invention identifies various permutations which may occur between the three input documents (e.g. "old US", "new US", and "old loc") and decides what information to include with the "new loc" database.

More specifically, the different permutations which may occur are identified with the table below:

| Permutation | New U.S. exists? | Comparison | Old U.S. exists? | Old Loc. |
|---|---|---|---|---|
| 1 | yes | = | yes | yes |
| 2 | yes | ≠ | yes | yes |
| 3 | no |  | yes | yes |
| 4 | yes |  | no | yes |
| 5 | no |  | no | yes |
| 6 | yes | = | yes | no |
| 7 | yes | ≠ | yes | no |
| 8 | no |  | yes | no |
| 9 | yes |  | no | no |

Permutation 1 (e.g. event 1) represents the best case scenario. An object exists in both the new U.S. and old U.S. databases and has not changed at all. Also, a representation of that object exists in the old localized version of the file. In this situation, the old localized version is automatically copied to the new localized version of the file, as illustrated in FIG. 26.

Permutation 2 represents the situation where an object has changed from the old U.S. to the new U.S. versions of the file, and the old localized version has a representation of the object. In this situation the old localized version is copied, and is flagged as a "wild guess" new localized version of the file. The user is informed that the localization tool is unsure about its decision by displaying "Wild Guess" above the window (336), as illustrated in FIG. 26. The user may then make the final decision regarding the propriety of the localization tool's decision.

Permutation 3 represents the situation where an object is deleted from the database in the new U.S. file. That is, it is present in the old U.S. and the old localized versions of the file, but is not present in the new U.S. version. In this situation, nothing is copied to the new localized version.

Permutation 4 represents a situation where an object exists in the new U.S. version and in the old localized version, but not in the old U.S. version. In this case, the corresponding object in the old localized version is copied to the new localized version and is flagged as a "wild guess".

Permutation 5 represents the situation where an object exists in the old localized version but is not present in either the new U.S. version or the old U.S. version. This object was presumably added by the localizer who generated the old localized version. In this situation nothing is copied to the new localized file.

Permutation 6 represents the situation where an object exits in the new U.S. version and in the old U.S. version, but not in the localized version. The two representations of the object are identical. In this situation the object in the new U.S. version is copied to the new localized version, and is flagged as "previously deleted". This indicates that the object was deleted by the localizer before and probably will need to be deleted again when the localizer is adding finishing touches.

Permutation 7 is identical to permutation 6 except that the two representations of the object are not identical in the U.S. files. In this situation, the object in the new U.S. version is copied to the new localized version, and is flagged as "previously deleted".

Permutation 8 represents the situation where an object exists only in the old U.S. version. Nothing is copied to the new localized version.

Permutation 9 represents the situation where a new object has been added and appears only in the new U.S. version. The object is copied to the new localized version and is flagged as "new".

B.7 Recording Module

The recording module (192) preferably logs all of the revisions made in any of the other editors. For instance, suppose a French localizer has spent several hours converting the textual messages in a U.S. application guidance help file to their French counterpart. If the recording module is activated, it will track and log all of the modifications made by the French localizer. This information is stored as a script file which can be run to repeat the series of events during the French localizer's editing session.

Now assume that another localizer seeks to convert the U.S. file to another language, such as Spanish. The Spanish localizer may run a script file created by the French localizer, thereby automatically repeating the same operations performed by the French operator. This offers great potential in reducing the workload of the second Spanish localizer. The recording module may be implemented using an Apple Script recording module, as described in *Inside Macintosh*, by Apple Computer, Inc. However, it will be apparent that other commercially available recording modules may be used.

The attached appendix lists internal data structures to the user guidance editor interface. For instance, the data structures are used by panel editor and the sequence editor to manipulate script source.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

In particular, the present invention has been discussed in terms of help guidance information to facilitate discussion. However, it will be apparent to one having ordinary skill in the art that the principles disclosed herein are applicable to other programming and editing environments.

APPENDIX

```
void InitializeKublai( void );
void DestructKublai( void );
TLinkedList* GetParseTree( void );
char*      FunctionCallParamToText(
           const TFunctionCallParam &fnCall );
TextObj*   DuplicateTextObj( const TextObj &textObj );
class TStatement: public TLinkedListElement
{
    public:
        long                fStatementToken;
        TLinkedList*        fParameterList;
        TLinkedList*        fContainedStatements;
        TextObjP            fCommentAtEndOfLine;
        TStatement( long statementToken );
        ~TStatement( void );
        TObject*     Clone(void) throw( );
};
class TParameter: public TLinkedListElement
{
    public:
        ~TParameter (void);
        TLinkedList*        fContainedParameters;
        TObject*            Clone(void) throw( );
        TLinkedList*        DuplicateContainedParams(void) throw( );
};
class TStringParam: public TParameter
{
    public:
        char*               fString;
        TStringParam( char* string );
        ~TStringParam( void );
        TObject*            Clone(void) throw( );
```

APPENDIX-continued

```
};
class TFunctionCallParam: public TParameter
{
    public:
        char*           fFunctionName;
        TFunctionCallParam( char* functionName );
        ~TFunctionCallParam( void );
        TObject*        Clone(void) throw( );
};
class TIntegerParam: public TParameter
{
    public:
        long            fInteger;
        TIntegerParam( long a );
        TObject*        Clone(void) throw( );
};
class TOSTypeParam: public TParameter
{
    public:
        OSType          fOSType;
        TOSTypeParam( OSType a );
        TObject*        Clone(void) throw( );
};
class TKeywordParam: public TParameter
{
    public:
        long            fKeyword;
        TKeywordParam( long a );
        TObject*        Clone(void) throw( );
};
class TNullParam: public TParameter
{
    public:
        TObject*        Clone(void) throw( );
};
class TRGBColorParam: public TParameter
{
    public:
        RGBColor        fRGBColor;
        TRGBColorParam( RGBColor a ) { fRGBColor = a; };
        TObject*        Clone(void) throw( );
};
class TColumnParam: public TParameter
{
    public;
        long            fTop;
        long            fLeft;
        long            fRight;
        TColumnParam( long top, long left, long right );
        TObject*        Clone(void) throw( );
};
class TPointParam: public TParameter
{
    public:
        Point           fPoint;
        TPointParam( Point a ) { fPoint = a; };
        TObject*        Clone(void) throw( );
};
class TRectParam: public TParameter
{
    public:
        Rect            fRect;
        TRectParam( Rect a ) { fRect = a; };
        TObject*        Clone(void) throw( );
};
class TRedArrowParam: public TParameter
{
    public:
        long            fStart;
        long            fEnd;
        TRedArrowParam( long start, long end );
        TObject*        Clone(void) throw( );
};
class TStyledStringParam: public TParameter
{
    public:
        TextObjP        fStyledString;
        TStyledStringParam( TextObjP styledString );
        ~TStyledStringParam(void);
```

APPENDIX-continued

```
        TObject*        Clone(void) throw( );
};
class TOrParam: public TParameter
{
    public:
        TParameter*     fLeft;
        TParameter*     fRight;
        TOrParam( TParameter* left, TParameter* right );
        ~TOrParam(void);
        TObject*        Clone(void) throw( );
};
class TAndParam: public TParameter
{
    public:
        TParameter*     fLeft;
        TParameter*     fRight;
        TandParam( TParameter* left, TParameter* right )
        ~TAndParam(void);
        TObject*        Clone(void) threw( );
};
class TNotParam: public TParameter
{
    public:
        TParameter*     fCondition;
        TNotParam( TParameter* condition );
        ~TNotParam(void);
        TObject*        Clone(void) throw( );
};
```

What is claimed is:

1. A method for updating a candidate computer program file in a computer processing device, the method comprising the steps of:

loading first and second versions of a first computer program file in the computer processing device, said second version of said first computer program file constituting a revision of said first version of said first computer program file, said first computer program file including a plurality of components which are each respectively assigned a component identifier, wherein components respectively included in both of said first and second versions of said first computer program file share the same component identifier;

loading a first version of a second computer program file in the computer processing device, said first version of said second computer program file including a plurality of components which are each respectively assigned a component identifier, wherein components of said first version of said second computer program file which respectively correspond to components of said first version of said first computer program file are assigned the same component identifier as the corresponding component included in said first version of said first computer program file; and generating, in the computer processing device, said candidate computer program file by making reference to the component identifiers of the components included in said first and second versions of said first computer program file and the component identifiers of the components included in said first version of said second computer program file, and updating the components of said first version of said second computer program file to correspond to updated components in said second version of said first computer program file which have the same component identifier as a corresponding component in said first version of said second computer program file.

2. The method of claim 1, wherein:
said first and second versions of said first computer program file are associated with a first revision and a second revision of a computer program file expressed in a first natural language, respectively;
said first version of said second computer program file is associated with a first revision of a computer program file expressed in a second natural language; and
said candidate computer program is associated with a second revision of said second computer program file expressed in said second natural language.

3. The method of claim 1, wherein:
said first and second versions of said first computer program file are associated with a first version and a first revision of a computer program file expressed in a first natural language, respectively;
said first version of said second computer program file is associated with a first version of a computer program file expressed in a second natural language; and
said candidate computer program is associated with a first revision of said second computer program file expressed in said second natural language.

4. A computer system for updating a candidate computer program file, said computer system comprising:
loading means for loading a first version and a second revisions version of a first computer program file, and for loading a first version of a second computer program file;
wherein said second version of said first computer program file constitutes a revision of said first version of said first computer program file, said first computer program file includes a plurality of components which are each respectively assigned a component identifier, and components respectively included in both of said first and second versions of said first computer program file share the same component identifier;
wherein said first version of said second computer program file includes a plurality of components which are each respectively assigned a component identifier, and components of said first version of said second computer program file which respectively correspond to components of said first version of said first computer program file are assigned the same component identifier as the corresponding component included in said first version of said first computer program file; and
wherein said computer system further comprises an editor for generating said candidate computer program file by making reference to the component identifiers of the components included in said first and second versions of said first computer program file and the component identifiers of the components included in said first version of said second computer program file, and updating the components of said first version of said second computer program file to correspond to updated components in said second version of said first computer program file which have the same component identifier as a corresponding component in said first version of said second computer program file.

5. The computer system of claim 4, wherein:
said first and second versions of said first computer program file are associated with a first revision and a second revision of a computer program file expressed in a first natural language, respectively;
said first version of said second computer program file is associated with a first revision of a computer program file expressed in a second natural language; and
said candidate computer program is associated with a second revision of said second computer program file expressed in said second natural language.

6. The computer system of claim 4, wherein:
said first and second versions of said first computer program file are associated with a first version and a first revision of a computer program file expressed in a first natural language, respectively;
said first version of said second computer program file is associated with a first version of a computer program file expressed in a second natural language; and
said candidate computer program is associated with a first revision of said second computer program file expressed in said second natural language.

7. A computer processing device comprising:
a memory unit configured to record therein first and second revisions of a first computer program file, and a first revision of a second computer program file;
wherein said second version of said first computer program file constitutes a revision of said first version of said first computer program file, said first computer program file includes a plurality of components which are each respectively assigned a component identifier, and components respectively included in both of said first and second versions of said first computer program file share the same component identifier;
wherein said first version of said second computer program file includes a plurality of components which are each respectively assigned a component identifier, and components of said first version of said second computer program file which respectively correspond to components of said first version of said first computer program file are assigned the same component identifier as the corresponding component included in said first version of said first computer program file; and
wherein said computer processing device further comprises a processing unit configured to load said first and second versions of said first computer program file from said memory unit, to load said first version of said second computer program file from said memory unit, and to generate a candidate computer program file by making reference to the component identifiers of the components included in said first and second versions of said first computer program file and the component identifiers of the components included in said first version of said second computer program file, and by updating the components of said first version of said second computer program file to correspond to updated components in said second version of said first computer program file which have the same component identifier as a corresponding component in said first version of said second computer program file.

8. The computer processing device of claim 7, wherein:
said first and second versions of said first computer program file are associated with a first revision and a second revision of a computer program file expressed in a first natural language, respectively;
said first version of said second computer program file is associated with a first revision of a computer program file expressed in a second natural language; and
said candidate computer program is associated with a second revision of said second computer program file expressed in said second natural language.

9. The computer processing device of claim 7, wherein:
said first and second versions of said first computer program file are associated with a first version and a first revision of a computer program file expressed in a first natural language, respectively;

said first version of said second computer program file is associated with a first version of a computer program file expressed in a second natural language; and said candidate computer program is associated with a first revision of said second computer program file expressed in said second natural language.

* * * * *

UNITED STATES PATENT AND TRADEMARK OFFICE
CERTIFICATE OF CORRECTION

| | | |
|---|---|---|
| PATENT NO. | : 7,840,956 B2 | Page 1 of 1 |
| APPLICATION NO. | : 11/134373 | |
| DATED | : November 23, 2010 | |
| INVENTOR(S) | : Michael Lane Gough et al. | |

It is certified that error appears in the above-identified patent and that said Letters Patent is hereby corrected as shown below:

On Sheet 18 of 25, in Figure 22, line 8, delete "compuer's" and insert -- computer's --, therefor.

On Sheet 18 of 25, Reference Numeral 340, in Figure 27, line 4, delete "#Cowabung" and insert -- #Cowabunga --, therefor.

In column 6, line 38, delete "#Cowabung" and insert -- #Cowabunga --, therefor.

In column 8, line 26, delete "win" and insert -- will --, therefor.

In column 10, line 5, delete "MoFe" and insert -- More --, therefor.

In column 10, line 20, after "any" delete "on" and insert -- one --, therefor.

In column 11, line 42, after "may" delete "by" and insert -- be --, therefor.

In column 17, line 27, in Claim 4, before "version" delete "revisions".

Signed and Sealed this
Eighth Day of November, 2011

David J. Kappos
*Director of the United States Patent and Trademark Office*